(12) United States Patent
Harada et al.

(10) Patent No.: US 6,343,269 B1
(45) Date of Patent: Jan. 29, 2002

(54) SPEECH DETECTION APPARATUS IN WHICH STANDARD PATTERN IS ADOPTED IN ACCORDANCE WITH SPEECH MODE

(75) Inventors: Masaaki Harada; Shin Takeuchi, both of Nakai-machi (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 09/320,708

(22) Filed: May 27, 1999

(30) Foreign Application Priority Data

Aug. 17, 1998 (JP) .......................................... 10-230593

(51) Int. Cl.[7] ........................... G10L 15/24; G10L 15/20
(52) U.S. Cl. ...................................... 704/243; 704/275
(58) Field of Search ................................ 704/214, 215, 704/231, 243, 251, 254, 270, 275; 382/116, 118

(56) References Cited

U.S. PATENT DOCUMENTS

| | | | | |
|---|---|---|---|---|
| 4,757,541 A | * | 7/1988 | Beadles ...................... | 704/254 |
| 5,893,058 A | * | 4/1999 | Kosaka ....................... | 704/254 |
| 5,911,128 A | * | 6/1999 | DeJaco ....................... | 704/221 |
| 5,913,188 A | * | 6/1999 | Tzirkel-Hancock ......... | 704/223 |
| 6,272,466 B1 | * | 8/2001 | Harada et al. .............. | 704/270 |

FOREIGN PATENT DOCUMENTS

| | | |
|---|---|---|
| JP | A-52-112205 | 9/1977 |
| JP | A-55-121499 | 9/1980 |
| JP | A-57-160440 | 10/1982 |
| JP | A-60-3793 | 1/1985 |
| JP | A-62-239231 | 10/1987 |
| JP | A-3-40177 | 2/1991 |
| JP | A-4-257900 | 9/1992 |
| JP | A-6-12483 | 1/1994 |
| JP | A-6-43897 | 2/1994 |
| JP | A-7-306692 | 11/1995 |
| JP | A-8-187368 | 7/1996 |
| JP | A-9-325793 | 12/1997 |
| JP | A-10-11089 | 1/1998 |

OTHER PUBLICATIONS

Bin Zhang et al., "Research on an automated speech pattern recognition system based on lip movement," 18th Annual International Conference of the IEEE Engineering in Medicine and Biology Society, Oct.–Nov. 1996, vol. 4, pp. 1530–1531.*

C. Bregler et al., "Improving Connected Letter Recognition By Lipreading", Proc. IEEE ICASSP pp. 557–560, 1993.

Kurita et al., "Physiological Model For Realizing An Articulation Operation Of The Lips", The Journal of the Acoustical Society of Japan, vol. 50, No. 6, pp. 465–473, 1994.

* cited by examiner

Primary Examiner—William Korzuch
Assistant Examiner—Martin Lerner
(74) Attorney, Agent, or Firm—Oliff & Berridge, PLC

(57) ABSTRACT

An articulator shape input section detects movements of an articulator and generates feature data of speech. On the other hand, a speech mode detection section of a speech mode input section detects a mode of the speech. The kind of standard pattern is selected in accordance with the detected speech mode or a speech mode that is specified manually through a speech mode manual input section. A comparison section detects the speech by comparing the selected kind of standard pattern and the input feature data.

21 Claims, 36 Drawing Sheets

FIG.6A
FIG.6B
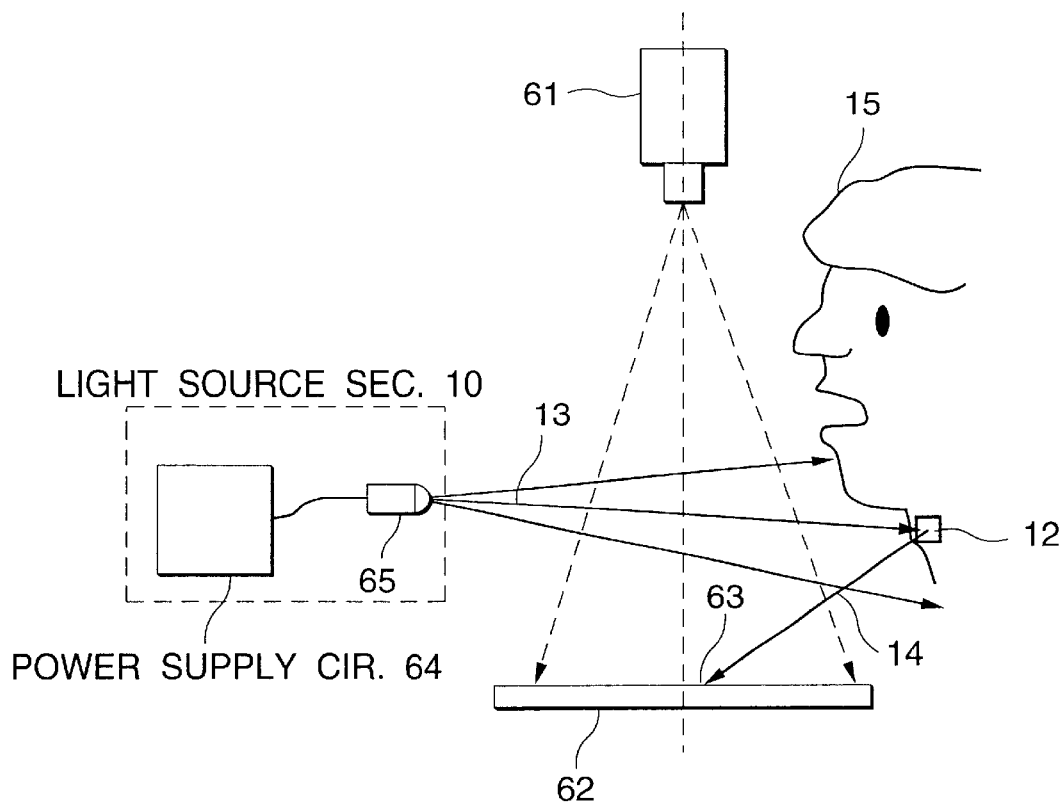
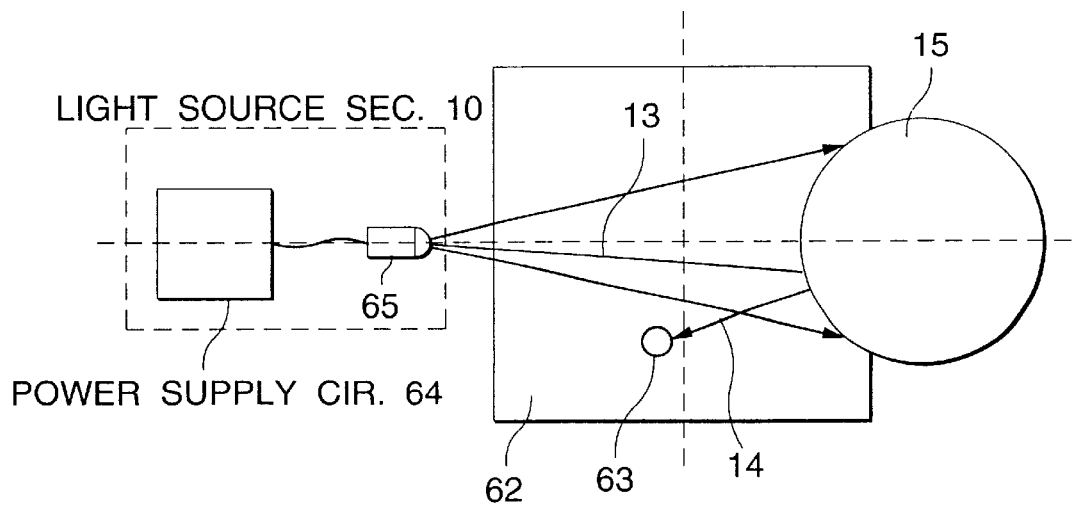

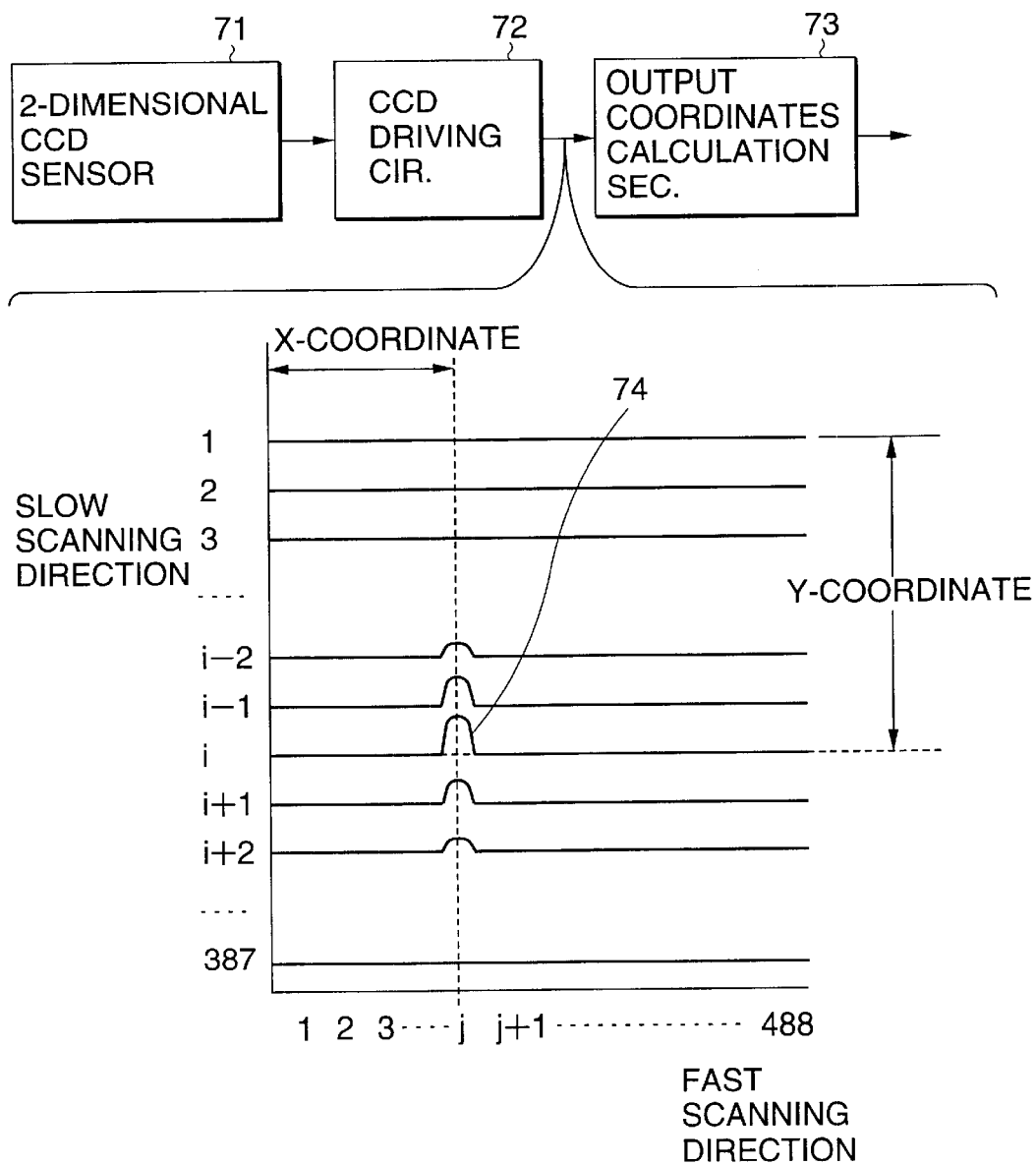

☐ LOCATIONS OF SPECULAR REFLECTION PLATES 12

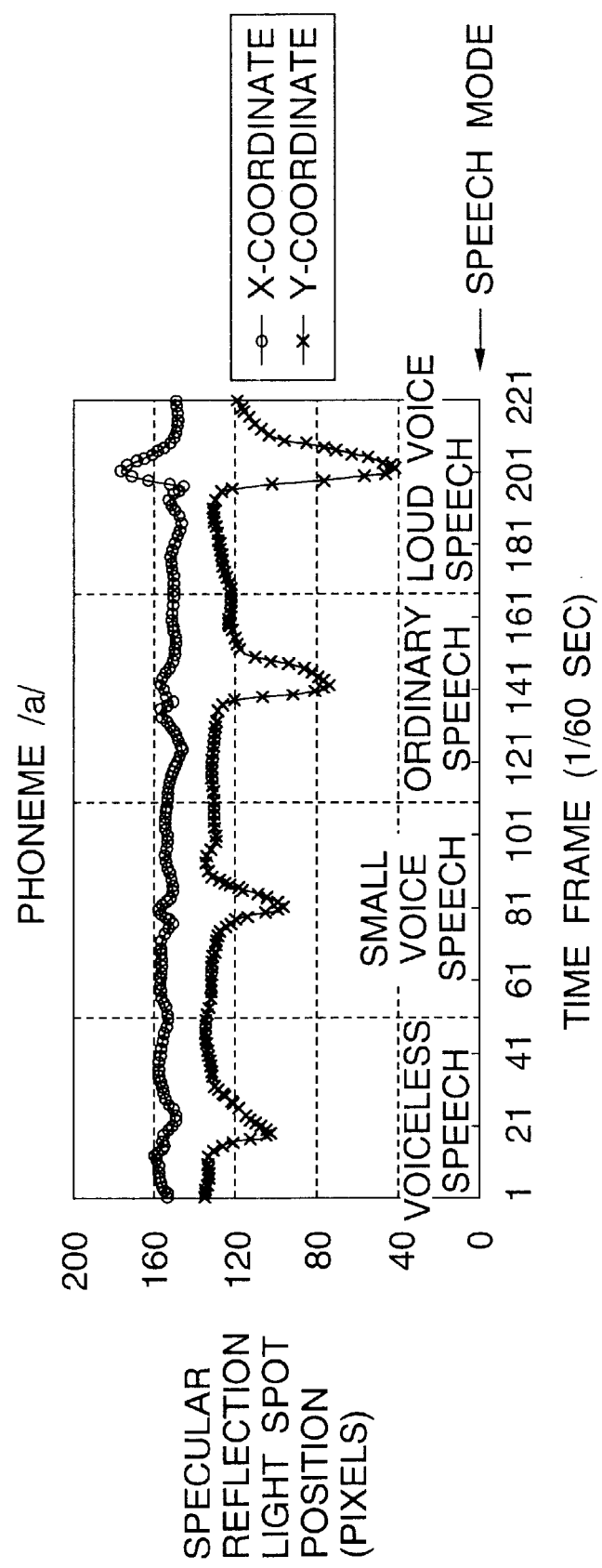

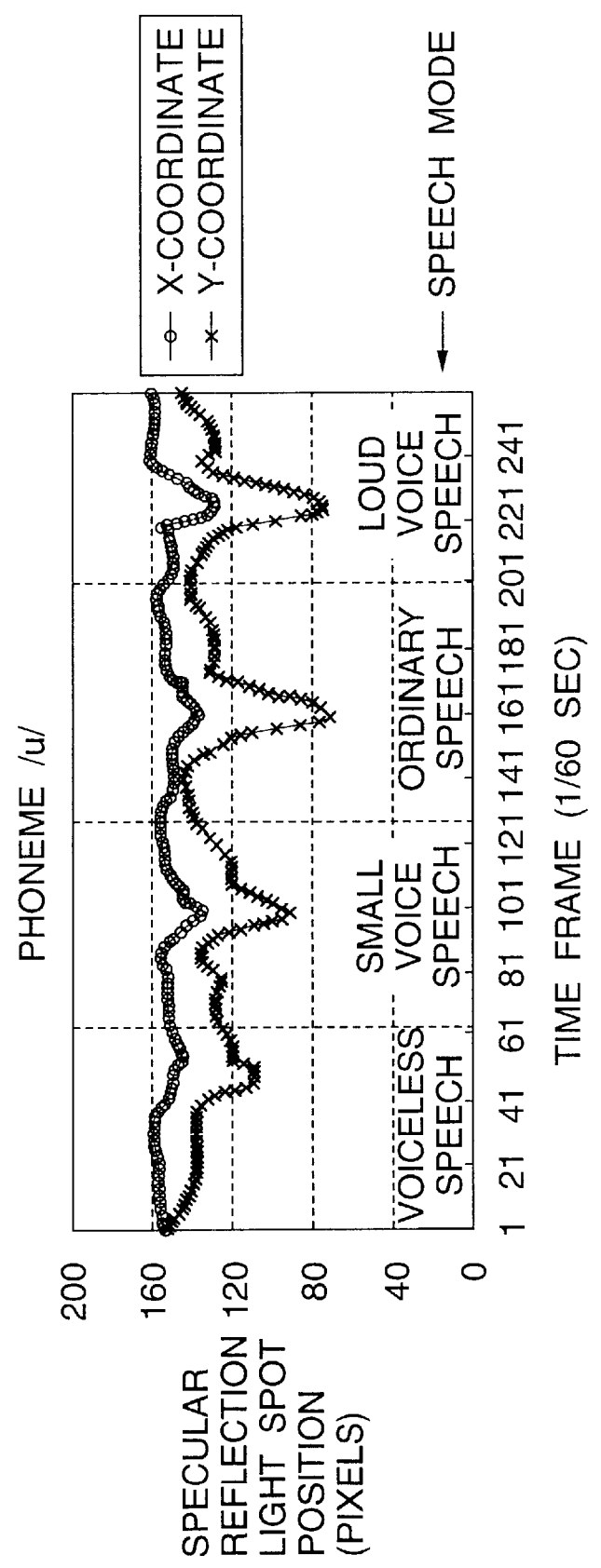

/u/, VOICELESS SPEECH MODE

/u/, SMALL VOICE SPEECH MODE

/u/, ORDINARY SPEECH MODE

/u/, LOUD VOICE SPEECH MODE

FIG.16

INPUT DATA: VOICELESS SPEECH MODE;
STANDARD PATTERN: VOICELESS SPEECH MODE

| STANDARD PATTERN /INPUT DATA | /a/ X2 VOICELESS | /za/ X2 VOICELESS | /ya/ X2 VOICELESS | /u/ X2 VOICELESS | /ra/ X2 VOICELESS | /ma/ X2 VOICELESS |
|---|---|---|---|---|---|---|
| /a/ X1 VOICELESS | 0.91336 | 0.9499 | -0.108 | 0.48416 | 0.51438 | 0.77491 |
| /za/ X1 VOICELESS | -0.0139 | 0.50282 | 0.46409 | 0.76533 | 0.53429 | 0.21249 |
| /ya/ X1 VOICELESS | 0.33344 | 0.6474 | 0.60666 | 0.81361 | 0.67302 | 0.49668 |
| /u/ X1 VOICELESS | 0.59673 | 0.00973 | 0.00595 | 0.82172 | 0.66873 | 0.72927 |
| /ra/ X1 VOICELESS | 0.20461 | 0.58526 | 0.50693 | 0.83459 | 0.73904 | 0.39082 |
| /ma/ X1 VOICELESS | 0.87001 | 0.16031 | 0.09434 | 0.45923 | 0.61553 | 0.90049 |

FIG. 17

INPUT DATA: VOICELESS SPEECH MODE;
STANDARD PATTERN: SMALL VOICE SPEECH MODE

| STANDARD PATTERN /INPUT DATA | /a/ X2 VOICELESS | /za/ X2 VOICELESS | /ya/ X2 VOICELESS | /u/ X2 VOICELESS | /ra/ X2 VOICELESS | /ma/ X2 VOICELESS |
|---|---|---|---|---|---|---|
| /a/ X1 SMALL | 0.46696 | 0.42142 | 0.35151 | 0.63828 | 0.84156 | 0.7949 |
| /za/ X1 SMALL | 0.29565 | 0.61911 | 0.50471 | 0.31275 | 0.57133 | 0.29837 |
| /ya/ X1 SMALL | 0.29126 | 0.50623 | 0.42064 | 0.5907 | 0.48025 | 0.2795 |
| /u/ X1 SMALL | 0.51822 | 0.32611 | 0.1861 | 0.74801 | 0.85264 | 0.79811 |
| /ra/ X1 SMALL | −0.0485 | 0.07548 | 0.12201 | −0.2761 | −0.4566 | −0.3665 |
| /ma/ X1 SMALL | 0.60352 | −0.1802 | −0.0811 | −0.1128 | −0.0631 | 0.38128 |

FIG.18

INPUT DATA: VOICELESS SPEECH MODE;
STANDARD PATTERN: ORDINARY SPEECH MODE

| STANDARD PATTERN /INPUT DATA | /a/ X2 VOICELESS | /za/ X2 VOICELESS | /ya/ X2 VOICELESS | /u/ X2 VOICELESS | /ra/ X2 VOICELESS | /ma/ X2 VOICELESS |
|---|---|---|---|---|---|---|
| /a/ X1 ORDINARY | 0.88724 | 0.40643 | 0.15197 | 0.38684 | 0.57864 | 0.84971 |
| /za/ X1 ORDINARY | 0.20797 | 0.09485 | 0.22803 | −0.1185 | −0.1889 | −0.0824 |
| /ya/ X1 ORDINARY | −0.1907 | 0.05806 | 0.09613 | −0.4195 | −0.5005 | −0.5393 |
| /u/ X1 ORDINARY | 0.4852 | 0.39383 | 0.33786 | 0.6926 | 0.82524 | 0.82531 |
| /ra/ X1 ORDINARY | 0.01048 | 0.02338 | 0.09751 | −0.1635 | −0.3614 | −0.2619 |
| /ma/ X1 ORDINARY | 0.24323 | −0.2014 | −0.1334 | −0.2703 | −0.4316 | −0.1292 |

FIG.19

INPUT DATA: VOICELESS SPEECH MODE;
STANDARD PATTERN: LOUD VOICE SPEECH MODE

| STANDARD PATTERN /INPUT DATA | /a/ X2 VOICELESS | /za/ X2 VOICELESS | /ya/ X2 VOICELESS | /u/ X2 VOICELESS | /ra/ X2 VOICELESS | /ma/ X2 VOICELESS |
|---|---|---|---|---|---|---|
| /a/ X1 LOUD | −0.019 | −0.2586 | −0.2469 | −0.3109 | −0.456 | −0.3842 |
| /za/ X1 LOUD | −0.0114 | −0.0171 | 0.07038 | −0.4163 | −0.5113 | −0.3657 |
| /ya/ X1 LOUD | −0.186 | 0.0763 | 0.09947 | −0.3165 | −0.4872 | −0.506 |
| /u/ X1 LOUD | 0.56905 | 0.37703 | 0.3393 | 0.53604 | 0.73523 | 0.8481 |
| /ra/ X1 LOUD | −0.1424 | 0.07076 | 0.19178 | −0.1721 | −0.3486 | −0.4132 |
| /ma/ X1 LOUD | −0.0088 | −0.1882 | −0.1182 | −0.412 | −0.5917 | −0.3814 |

| INPUT DATA / STANDARD PATTERN | VOICELESS SPEECH MODE | SMALL VOICE SPEECH MODE | ORDINARY SPEECH MODE | LOUD VOICE SPEECH MODE |
|---|---|---|---|---|
| VOICELESS SPEECH MODE | 66.7% | 16.7% | 33.3% | 33.3% |
| SMALL VOICE SPEECH MODE | 33.3% | 50.0% | 33.3% | 33.3% |
| ORDINARY SPEECH MODE | 33.3% | 66.7% | 50.0% | 50.0% |
| LOUD VOICE SPEECH MODE | 16.7% | 50.0% | 66.7% | 83.3% |

FIG. 26

| STANDARD PATTERN /INPUT DATA | /a/ X2 SMALL | /za/ X2 SMALL | /ya/ X2 SMALL | /u/ X2 SMALL | /ra/ X2 SMALL | /ma/ X2m SMALL |
|---|---|---|---|---|---|---|
| /a/ X1 SMALL + ORDINARY | <u>0.41355</u> | 0.08562 | <u>0.60189</u> | 0.82562 | −0.2276 | −0.0041 |
| /za/ X1 SMALL + ORDINARY | 0.4099 | <u>0.47913</u> | 0.25041 | −0.0738 | 0.51025 | 0.50628 |
| /ya/ X1 SMALL + ORDINARY | 0.40148 | 0.33261 | 0.11054 | −0.4186 | 0.66563 | 0.51287 |
| /u/ X1 SMALL + ORDINARY | 0.34765 | 0.06726 | 0.6616 | <u>0.91601</u> | −0.3173 | −0.3581 |
| /ra/ X1 SMALL + ORDINARY | 0.30913 | 0.0805 | −0.3198 | −0.7188 | <u>0.6928</u> | 0.81011 |
| /ma/ X1 SMALL + ORDINARY | 0.37996 | −0.1909 | −0.389 | −0.3047 | 0.23799 | <u>0.8666</u> |

FIG.28

| SPEECH MODE | ROUGH STANDARD OF NOISE LEVEL, AVERAGE VALUE IN dB (A), DISTANCE: 1 m | BREATHING AIR FLOW | VOCAL CORDS VIBRATION (VOICED SOUND) | ROUGH STANDARD OF MOUTH OPENING /CLOSURE (MEASURED ALONG CENTER LINE OF LIPS) |
|---|---|---|---|---|
| VOICELESS | 0 PHON | ABSENT | ABSENT | SMALL (~ 15mm) |
| WHISPER | ~ 20 PHONS | PRESENT | ABSENT | SMALL (~ 15mm) |
| SMALL VOICE | 20 ~ 30 PHONS | PRESENT | PRESENT | SMALL (~ 15mm) |
| ORDINARY | 50 ~ 60 PHONS | PRESENT | PRESENT | MEDIUM (~ 30mm) |
| LOUD VOICE | 50 ~ PHONS | PRESENT | PRESENT | LARGE (~ 50mm) |

FIG.29

A01: ARAYURU GENJITSUO SUBETE JIBUNNO HOE NEJIMAGETANODA.
(He interpreted every reality in such a way that it was favorable to him.)

A02: ISSHUKANBAKARI NYUYOKUWO SHUZAISHITA.
(I gathered material in New York for about one week.)

A03: TEREBIGEMUYA PASOKONDE GEMUWO SHITE ASOBU.
(Playing games by using a video game machine or a personal computer.)

A04: BUKKANO HENDOO KORYOSHITE KYUFU SUIJUNO KIMERU HITSUYOGAARU.
(It is necessary to determine the salary level in consideration of variations of prices.)

A05: KYUKYUSHAGA JUBUNNI UGOKEZU KYUJOSAGYOGA OKURETEIRU.
(The ambulance cannot move sufficiently and the saving operation is being delayed.)

A06: GENRONNO JIYUWA IPPO YUZUREBA HYOPPOMO SENPOMO SEMEKOMARERU.
(As for freedom of speech, a concession of one step will cause an attack of a hundred or thousand steps.)

A07: KAIJONO SHUHENNIWA HARAJUKUEKIYA YOYOGIEKIMO ARUSHI CHOTTO ARUKEBA SHINJUKUGYOENEKIMO ARU.
(The Harajuku station and the Yoyogi station exist near the site and a short walk brings you to the Shinjukugyoen station.)

A08: ROJINHOMUNO BAAIWA KENKOKIGUYA HIZAKAKEDA.
(For old-people's homes, health equipment and lap lobes are appropriate.)

A09: CHOTTO OSOI CHUSHOKUO TORUTAME FAMIRIRESUTORANNI HAITTANODESU.
(I entered a family Restaurant to take a little late lunch.)

A10: URESHIIHAZUGA YUKKURI NETEMO IRARENAI.
(I cannot afford to sleep well though I should be happy.)

FIG.36

STANDARD PATTERN, VOICELESS SPEECH MODE

INPUT DATA, VOICELESS SPEECH MODE

AVERAGE RECOGNITION RATE: 84.2%

FIG.37

STANDARD PATTERN, ORDINARY SPEECH MODE

INPUT DATA, VOICELESS SPEECH MODE

|    | a | i | u | e | o | ka | sa | ta | na | ha | ma | ya | ra | wa | ga | za | da | ba | pa |
|----|---|---|---|---|---|----|----|----|----|----|----|----|----|----|----|----|----|----|----|
| a  | ○ | ○ | ∘ | ∘ | ∘ | ○  | ○  | ○  | ○  | ●  | ○  | ○  | ○  | ∘  | ○  | ○  | ○  | ○  | ○  |
| i  | ∘ | ● | ∘ | ○ | ∘ | ∘  | ○  | ○  | ○  | ∘  | ∘  | ○  | ○  | ∘  | ○  | ○  | ○  | ∘  | ∘  |
| u  | · | · | ● | · | ○ | ·  | ·  | ·  | ·  | ·  | ·  | ·  | ∘  | ·  | ·  | ·  | ·  | ·  | ·  |
| e  | ○ | ● | · | ○ | ∘ | ·  | ∘  | ○  | ∘  | ∘  | ∘  | ·  | ○  | ○  | ∘  | ○  | ○  | ○  | ∘  |
| o  | ∘ | ∘ | · | ○ | ∘ | ●  | ·  | ·  | ·  | ·  | ∘  | ∘  | ·  | ·  | ○  | ∘  | ·  | ∘  | ·  |
| ka | ○ | ○ | ∘ | ∘ | ∘ | ○  | ○  | ○  | ∘  | ○  | ○  | ○  | ●  | ∘  | ○  | ○  | ○  | ∘  | ∘  |
| sa | ○ | ○ | · | ○ | ∘ | ○  | ○  | ∘  | ○  | ○  | ·  | ∘  | ○  | ∘  | ○  | ●  | ○  | ∘  | ○  |
| ta | ○ | ○ | · | ∘ | ∘ | ○  | ○  | ○  | ●  | ○  | ∘  | ·  | ○  | ∘  | ○  | ○  | ○  | ∘  | ∘  |
| na | ○ | ∘ | · | ∘ | ∘ | ○  | ○  | ●  | ○  | ∘  | ∘  | ·  | ○  | ∘  | ○  | ○  | ○  | ∘  | ∘  |
| ha | ○ | ∘ | · | ○ | ∘ | ○  | ○  | ○  | ○  | ○  | ∘  | ○  | ●  | ∘  | ○  | ○  | ○  | ○  | ○  |
| ma | ○ | ∘ | · | ○ | ∘ | ○  | ∘  | ∘  | ∘  | ∘  | ○  | ∘  | ∘  | ∘  | ∘  | ∘  | ∘  | ●  | ○  |
| ya | ○ | ∘ | · | ○ | ∘ | ○  | ○  | ○  | ∘  | ∘  | ∘  | ○  | ●  | ○  | ·  | ○  | ○  | ○  | ∘  |
| ra | ○ | ○ | · | ○ | ∘ | ○  | ○  | ○  | ∘  | ∘  | ○  | ∘  | ○  | ●  | ∘  | ○  | ○  | ○  | ∘  |
| wa | ○ | ∘ | · | ∘ | ∘ | ∘  | ∘  | ∘  | ∘  | ∘  | ○  | ∘  | ∘  | ∘  | ●  | ∘  | ∘  | ∘  | ∘  |
| ga | ○ | ∘ | · | ○ | · | ○  | ○  | ○  | ○  | ∘  | ○  | ∘  | ○  | ●  | ∘  | ○  | ○  | ∘  | ∘  |
| za | ○ | ∘ | · | ○ | · | ○  | ○  | ○  | ○  | ∘  | ∘  | ○  | ○  | ∘  | ∘  | ○  | ○  | ∘  | ∘  |
| da | ○ | ○ | · | ○ | · | ○  | ○  | ○  | ●  | ∘  | ∘  | ○  | ○  | ·  | ○  | ○  | ○  | ∘  | ∘  |
| ba | ○ | ∘ | · | ∘ | ∘ | ∘  | ∘  | ∘  | ∘  | ∘  | ○  | ∘  | ∘  | ·  | ·  | ·  | ·  | ○  | ●  |
| pa | ○ | ∘ | · | ∘ | ∘ | ∘  | ∘  | ∘  | ∘  | ∘  | ○  | ∘  | ∘  | ·  | ·  | ·  | ·  | ○  | ●  |

AVERAGE RECOGNITION RATE: 52.6%

FIG.38

STANDARD PATTERN, VOICELESS SPEECH MODE

INPUT DATA, ORDINARY SPEECH MODE

|    | a | i | u | e | o | ka | sa | ta | na | ha | ma | ya | ra | wa | ga | za | da | ba | pa |
|----|---|---|---|---|---|----|----|----|----|----|----|----|----|----|----|----|----|----|----|
| a  | ○ | ○ | · | ○ | · | ○  | ○  | ○  | ○  | ●  | ○  | ○  | ○  | ·  | ○  | ○  | ○  | ○  | ○  |
| i  | ○ | ● | · | ○ | · | ·  | ○  | ○  | ○  | ○  | ·  | ·  | ○  | ○  | ·  | ○  | ○  | ○  | ·  | ·  |
| u  | · | · | ● | · | ○ | ·  | ·  | ·  | ○  | ·  | ○  | ·  | ·  | ·  | ○  | ·  | ○  | ·  | ·  | ·  |
| e  | ○ | ○ | · | ● | · | ·  | ○  | ·  | ○  | ○  | ·  | ○  | ○  | ·  | ○  | ○  | ○  | ·  | ·  |
| o  | · | · | ○ | · | ● | ·  | ·  | ○  | ·  | ·  | ·  | ·  | ·  | ·  | ○  | ○  | ○  | ·  | ·  |
| ka | ○ | ○ | · | ○ | · | ○  | ○  | ○  | ·  | ○  | ○  | ○  | ·  | ○  | ○  | ●  | ·  | ·  |
| sa | ○ | ○ | · | ○ | · | ○  | ○  | ○  | ○  | ·  | ·  | ○  | ·  | ○  | ●  | ○  | ·  | ·  |
| ta | ○ | ○ | · | ○ | · | ○  | ○  | ●  | ○  | ○  | ·  | ○  | ○  | ·  | ○  | ○  | ○  | ·  | ·  |
| na | ○ | · | · | · | · | ○  | ○  | ○  | ○  | ●  | ·  | ○  | ○  | ·  | ○  | ○  | ○  | ·  | ·  |
| ha | ● | ○ | · | ○ | · | ○  | ○  | ○  | ○  | ○  | ○  | ○  | ·  | ○  | ○  | ○  | ○  | ○  |
| ma | ○ | · | · | ○ | · | ○  | ·  | ·  | ·  | ·  | ●  | ·  | ·  | ·  | ·  | ·  | ·  | ○  | ○  |
| ya | ○ | ○ | · | ○ | · | ○  | ○  | ○  | ·  | ·  | ○  | ●  | ○  | ·  | ○  | ○  | ○  | ·  | ·  |
| ra | ○ | ○ | · | ○ | · | ○  | ○  | ○  | ○  | ●  | ·  | ○  | ○  | ○  | ○  | ○  | ·  | ·  |
| wa | ○ | ○ | · | · | · | ·  | ·  | ·  | ·  | ○  | ·  | ·  | ·  | ●  | ·  | ·  | ·  | ·  | ·  |
| ga | ○ | ○ | · | ○ | · | ○  | ○  | ○  | ·  | ○  | ○  | ○  | ·  | ●  | ○  | ○  | ·  | ·  |
| za | ○ | · | · | ○ | · | ○  | ○  | ○  | ○  | ·  | ·  | ○  | ○  | ·  | ·  | ●  | ○  | ·  | ·  |
| da | ○ | ○ | · | ○ | · | ○  | ○  | ○  | ○  | ○  | ·  | ○  | ·  | ●  | ○  | ○  | ·  | ·  |
| ba | ○ | · | · | ○ | · | ○  | ○  | ·  | ·  | ○  | ●  | ·  | ○  | ·  | ·  | ·  | ·  | ○  | ○  |
| pa | ○ | ○ | · | ○ | · | ○  | ○  | ·  | ·  | ○  | ●  | ·  | ·  | ·  | ·  | ·  | ·  | ○  | ○  |

AVERAGE RECOGNITION RATE: 42.1%

FIG.39

STANDARD PATTERN,
ORDINARY SPEECH MODE

|   | a | i | u | e | o | ka | sa | ta | na | ha | ma | ya | ra | wa | ga | za | da | ba | pa |
|---|---|---|---|---|---|----|----|----|----|----|----|----|----|----|----|----|----|----|----|
| a | ● | ○ | ∘ | ∘ | ∘ | ○ | ○ | ○ | ∘ | ○ | ○ | ∘ | ○ | ∘ | ○ | ○ | ○ | ○ | ○ |
| i | ∘ | ● | · | ∘ | ○ | ∘ | ∘ | ○ | ○ | ○ | ○ | ∘ | ∘ | ○ | ○ | ∘ | ○ | ○ | ○ | ∘ | ∘ |
| u | · | ∘ | ● | · | ○ | · | · | · | · | · | · | · | · | ∘ | · | · | · | · | · |
| e | ∘ | ○ | · | ● | ∘ | · | ∘ | ○ | ∘ | ∘ | ∘ | ∘ | ∘ | ○ | ○ | ∘ | ○ | ○ | ∘ | ∘ |
| o | ∘ | ∘ | · | ∘ | ● | · | · | · | · | ∘ | ∘ | · | ∘ | ∘ | ∘ | · | ∘ | · | · |
| ka | ○ | ○ | ∘ | ∘ | ∘ | ○ | ○ | ∘ | ● | ○ | ○ | ○ | ○ | ∘ | ○ | ○ | ○ | ∘ | ∘ |
| sa | ○ | ○ | · | ○ | ∘ | ○ | ● | ∘ | ○ | ○ | ∘ | ∘ | ○ | ∘ | ∘ | ○ | ○ | ∘ | ∘ |
| ta | ○ | ○ | · | ∘ | ∘ | ○ | ○ | ● | ○ | ∘ | ∘ | ∘ | ○ | ∘ | ○ | ○ | ∘ | ∘ | ∘ |
| na | ○ | ∘ | · | ∘ | ∘ | ○ | ○ | ○ | ● | ∘ | · | ∘ | ○ | ∘ | ○ | ∘ | ○ | ∘ | ∘ |
| ha | ○ | ○ | · | ○ | ∘ | ○ | ○ | ○ | ○ | ● | ∘ | ○ | ○ | ∘ | ∘ | ○ | ○ | ○ | ○ |
| ma | ○ | ∘ | · | ○ | ∘ | ○ | ∘ | ∘ | ∘ | ∘ | ○ | ∘ | ○ | ∘ | ∘ | ∘ | ∘ | ○ | ● |
| ya | ○ | ○ | · | ○ | ∘ | ○ | ○ | ○ | ∘ | ∘ | ○ | ● | ○ | ∘ | ○ | ○ | ∘ | ○ | ∘ |
| ra | ○ | ○ | · | ○ | ∘ | ○ | ○ | ○ | ○ | ○ | ∘ | ○ | ● | ∘ | ○ | ○ | ○ | ○ | ∘ |
| wa | ○ | ∘ | ∘ | ∘ | ∘ | ∘ | ∘ | ∘ | ∘ | ○ | ∘ | ∘ | ∘ | ● | ∘ | ∘ | ∘ | ∘ | ∘ |
| ga | ○ | ○ | · | ∘ | ∘ | ○ | ○ | ○ | ● | ○ | ∘ | ○ | ○ | ∘ | ○ | ○ | ∘ | ∘ | ∘ |
| za | ○ | ∘ | · | ∘ | ∘ | ○ | ○ | ○ | ○ | ∘ | ∘ | ○ | ○ | ∘ | ∘ | ● | ○ | · | · |
| da | ○ | ○ | · | · | ∘ | ○ | ○ | ○ | ○ | ○ | ∘ | ○ | ● | ∘ | ○ | ○ | ○ | ∘ | ∘ |
| ba | ○ | ∘ | · | ∘ | ∘ | ∘ | ∘ | ∘ | ∘ | ○ | ○ | ∘ | ∘ | ∘ | ∘ | ∘ | ∘ | ○ | ● |
| pa | ○ | ∘ | · | ∘ | ∘ | ∘ | ∘ | ∘ | ∘ | ○ | ○ | ○ | ○ | ∘ | ∘ | ∘ | ∘ | ● | ○ |

INPUT DATA, ORDINARY SPEECH MODE

AVERAGE RECOGNITION RATE: 68.4%

FIG.40

| | | INPUT DATA | |
|---|---|---|---|
| | | VOICELESS SPEECH MODE | ORDINARY SPEECH MODE |
| STANDARD PATTERN | VOICELESS SPEECH MODE | 84.2% | 42.1% |
| | ORDINARY SPEECH MODE | 52.6% | 68.4% |

SPEECH DETECTION APPARATUS IN WHICH STANDARD PATTERN IS ADOPTED IN ACCORDANCE WITH SPEECH MODE

BACKGROUND OF THE INVENTION

1. Field of the Invention

The present invention relates to a speech input and detection technique that is not affected by noise occurring in a noise environment or a situation where many people speak simultaneously. And the invention relates to a speech detection apparatus for outputting speech information that is detected from movements of an articulator of a human to information equipment such as a computer or a word processor.

The invention relates to a technique of enabling detection of speech information in both cases of voiced speech and voiceless speech by mimicry. Therefore, the technique of the invention can be utilized not only in offices or the like where silence is required and the use of related speech input techniques is not suitable, but also for input of a content that the user does not want to be heard by other people. As such, the invention greatly increases the range of use of speech detection apparatus. Further, the invention can be utilized for a speech detection apparatus for providing barrier-free equipment that enables deaf people, people having difficulty in hearing, and aged people to communicate information smoothly.

2. Description of the Related Art

The target of a speech detection apparatus (machine) is to enable the user's speech to be input correctly and quickly in any environment. An ordinary speech detection apparatus employs a speech recognition technique of recognizing and processing speech information by analyzing frequencies of a voice as a sound. To this end, the cepstrum analysis method or the like is utilized that enables separation and extraction of a spectrum envelope or a spectrum fine structure of a voice. However, this speech recognition technique has a principle-related disadvantage that naturally it cannot detect speech information unless it receives sound information generated by vocalization. That is, such a speech detection apparatus cannot be used in offices, libraries, etc. where silence is required, because during speech input a voice of a speaker is annoying to nearby people. This type of speech detection apparatus is not suitable for input of a voice having a content that the user does not want to be heard by nearby people. Further, the user will be rendered in a psychology of feeling reluctant to murmur alone to the machine. This tendency is enhanced in a situation where people exist around the user. These disadvantages limit the range of use of speech recognition apparatus and are major factors of obstructing the spread of speech input apparatus. Another obstructive factor is that continuing to speak is unexpectedly a physical burden. It is considered that continuing voice input for hours like manipulating a keyboard will make the user's voice hoarse and hurt his vocal cords.

On the other hand, studies of acquiring speech information from information other than sound information have been made conventionally. The vocal organs directly relating to vocalization of a human are the lungs 901 as an air flow mechanism, the larynx 902 as a vocalization mechanism, the oral cavity 903 and the nasal cavity 904 that assume the mouth/nasal cavity function, and the lips 905 that assume the articulation function, though the classification method varies from one technical book to another. FIG. 9 shows the arrangement of those organs (the lungs 901 are not shown). Studies of acquiring speech information from visual information of the lips 905 among these vocal organs have been made to provide techniques for people handicapped in hearing. It was pointed out that the speech recognition accuracy can be improved by adding visual information of movements of the lips 905 of a speaker to a speech recognition technique (C. Bregler, H. Hild, S. Manke, and A. Waible, "Improving Connected Letter Recognition by Lipreading", *Proc. IEEE ICASSP*, pp. 557–560, 1993).

Among speech recognition techniques using visual information of the lips, a technique with image processing that uses an image that is input from a video camera is employed most frequently. For example, in Japanese Unexamined Patent Publication No. Hei. 6-43897, as shown in FIG. 10, it was attempted to observe movements of the lips by capturing images of 10 reflective markers M0 to M9 themselves that were attached to the lips 905 of a speaker and a portion around them, detecting two-dimensional movements of the markers M0 to M9, and determining five lip feature vector components 801–805. In Japanese Unexamined Patent Publication No. Sho. 52-112205, it was intended to improve the accuracy of speech recognition by reading the positions of black markers attached to the lips and a portion around them from scanning lines of a video camera. This publication does not have any specific disclosure as to a marker extraction method; a two-dimensional image pre-process and feature extraction technique for discriminating the markers from density differences that are caused by shades formed by the nose and the lips, a mustache, skin color differences, a mole, a scratch or abrasion, etc. are needed.

To solve this problem, Japanese Unexamined Patent Publication No. Sho. 60-3793 proposed a lip information analyzing apparatus in which four high-luminance markers such as light-emitting diodes are attached to the lips to facilitate the marker position detection, movements of the markers themselves are imaged by a video camera, and pattern recognition is performed on a voltage waveform that is obtained by a position sensor called a high-speed multi-point X-Y tracker. However, even with this technique, when it is attempted to detect speech in a bright room, means is needed to prevent noise that is caused by high-luminance reflection light components coming from the glasses, a gold tooth, etc. of a speaker. Although preprocessing and a feature extraction technique for a two-dimensional image that is input from a television camera are needed for this purpose, the publication No. Sho. 60-3793 has no disclosure as to such a technique.

Several methods have been proposed in which features of a vocal organ are extracted by capturing an image of the lips and a portion around them directly without using markers and performing image processing on the image. For example, in Japanese Unexamined Patent Publication No. Hei. 6-12483, an image of the lips and a portion around them is captured by a camera and vocalized words are estimated by a back propagation method from an outline image obtained by image processing. Japanese Unexamined Patent Publication No. Sho. 62-239231 proposed a technique of using a lip opening area and a lip aspect ratio to simplify lip image information. Japanese Unexamined Patent Publication No. Hei. 3-40177 discloses a speech recognition apparatus retaining, as a database, correlation between vocalized sounds and lip movements to perform recognition for indefinite speakers. Japanese Unexamined Patent Publication No. Hei. 9-325793 proposed to lower the load on a speech recognition computer by decreasing the number of candidate words based on speech-period mouth shape information that is obtained from an image of the mouth of a speaker. However, since these related methods utilize positional information obtained from a two-dimensional image of the lips and a portion around them, for correct input of image information a speaker is required to open and close his lips clearly. It is difficult to detect movements of the lips and a portion around them in speech with a small degree of lip opening/closure and no voice output (hereinafter referred to as "voiceless speech") and speech with a small voice, let alone speech with almost no lip movements as in the case of ventriloquism. Further, the above-cited references do not refer to any speech detection technique that utilizes, to improve the recognition rate, speech modes such as a voiceless speech mode paying attention to differences between an ordinary speech mode and other ones. The "speech mode" indicating a speech state will be described in detail in the "Summary of the Invention" section.

Several methods have been proposed that do not use a video camera, such as a technique of extracting speech information from a myoelectric potential waveform of the lips and a portion around those. For example, Japanese Unexamined Patent Publication No. Hei. 6-12483 discloses an apparatus that utilizes binary information of a myoelectric potential waveform to provide means that replaces image processing. Kurita, et al. invented a model for calculating a lip shape based on a myoelectric signal ("Physiological Model for Realizing an Articulation Operation of the Lips", *The Journal of the Acoustical Society of Japan*, Vol. 50, No. 6, pp. 465–473, 1994). However, the speech information extraction using myoelectric potentials has a problem that a heavy load is imposed on a speaker because electrodes having measurement cords need to be attached to the lips and a portion around them.

Several inventions have been made in which tongue movements associated with speech of a speaker are detected by mounting an artificial palate to obtain a palatograph signal and a detection result is used in a speech detection apparatus. For example, Japanese Unexamined Patent Publication No. Sho. 55-121499 proposed means for converting presence/absence of contacts between the tongue and transmission electrodes that are incorporated in an artificial palate to an electrical signal. Japanese Unexamined Patent Publication No. Sho. 57-60440 devised a method of improving the touch of the tongue by decreasing the number of electrodes incorporated in an artificial palate. Japanese Unexamined Patent Publication No. Hei. 4-257900 made it possible to deal with indefinite speakers by causing a palatograph photodetection signal to pass through a neural network.

An apparatus that does not utilize tongue movements was proposed in Japanese Unexamined Patent Publication No. Sho. 64-62123 in which vibration of the soft palate is observed by bringing the tip portion of a bush rod into contact with the soft palate. Further, a study was made as to the relationship between the articulator shape and speech by mounting a plurality of metal pellets on a vocal organ, in particular the tongue in the oral cavity, and using an X-ray micro-beam instrument that measures the positions of the metal pellets (Takeshi Token, Kiyoshi Honda, and Yoichi Higashikura, "3-D Observation of Tongue Articulatory Movement for Chinese Vowels", *Technical Report of IEICE*, SP97-11, 1997-06). A similar study was made to investigate the relationship between the articulatory movement locus and speech by mounting magnetic sensors on a vocal organ in the oral cavity and using a magnetic sensor system that measures the position of the magnetic sensors (Tsuyoshi Okadome, Tokihiko Kaburagi, Shin Suzuki, and Masahiko Honda, "From Text to Articulatory Movement," Acoustical Society of Japan 1998 Spring Research Presentation Conference, Presentation no. 3-7-10, March 1998). However, these techniques have problems that natural vocalization action may be obstructed and a heavy load is imposed on a speaker because devices need to be attached to an inside part of a human body. These references do not refer to any speech detection technique either that utilizes, to improve the recognition rate, speech modes such as a voiceless speech mode paying attention to differences between an ordinary speech mode and other ones.

U.S. Pat. No. 3,192,321 proposed, as a technique for detecting speech information more easily than the above techniques, a speech recognition system that is a combination of a speech recognition technique and a technique of directly applying a light beam to the lips and an integument portion around them and detecting speech based on the state of diffused reflection light coming from the skin and the way the lips interrupt the light beam. Japanese Unexamined Patent Publication No. Hei. 7-306692 proposed a similar technique in which speech information of a speaker is detected by applying a light beam to the lips and a portion around them, detecting diffused reflection light coming from the surface of the integument with a photodetector, and measuring an intensity variation of the diffused reflection light. However, neither reflection plates such as markers nor specular reflection plates are attached to the lips and a portion around them. Since the relationship between the intensity of reflection light and positions and movements of the lips is not necessarily clear, a neural network is used for a recognition process. As described in the specification, being low in speech detection accuracy, this technique is for roughly categorizing phonemes as an auxiliary means of a speech recognition technique. Japanese Unexamined Patent Publication No. Hei. 8-187368 discloses, as an example of use of this technique, a game that involves limited situations and in which conversations are expected to occur. Japanese Unexamined Patent Publication No. Hei. 10-11089 proposed a technique of detecting speech by measuring the blood amount in the lips and a portion around them by a similar method in which the detector is limited to an infrared detecting device. These techniques are narrowly effective for speech with large movements of the lips and a portion around them, and difficult to apply to input of voiceless or small voice speech in which the degree of opening/closure of the lips is small. The specifications do not refer to speech modes such as a voiceless speech mode.

As for the above-described related techniques that are intended to detect speech from the shape of an articulator, methods and apparatus for correlating speech and a certain kind of signal that is obtained from the articulator are described in detail. However, the above-cited references do not refer to, in a specific manner, voiceless speech nor relationships between speech and signals associated with different speech modes. Further, there is no related reference that clearly shows problems that are caused by speech mode differences and countermeasures. Although there exists a related reference that refers to speech without voice output (Japanese Unexamined Patent Publication No. Hei. 6-12483), it does not describe the handling of speech modes that are most important for improvement of the recognition rate.

Problems to be solved by the speech input technique of the invention are as follows. These problems cannot be solved by the related speech recognition techniques in terms of the principle and have not been dealt with in a specific manner by related techniques that are intended to detect speech from shape information of an articulator.

(1) A speech detection apparatus cannot be used in offices, libraries, etc. where silence is required, because during speech input a voice of a speaker is annoying to nearby people.

(2) Related techniques are not suitable for input of a content that a speaker does not want to be heard by nearby people.

(3) There is psychological reluctance to speaking alone to a machine.

(4) A speaker who continues to speak with voice output has a physical load.

SUMMARY OF THE INVENTION

To solve the above problems, it is necessary to enable speech detection in a voiceless speech mode with entirely no voice output as well as in a speech mode with voice output (hereinafter referred to as a voiced speech mode). If this becomes possible, the problems (1) to (3) are solved because no voice is output to the environment in the voiceless speech mode in which there is almost no respiratory air flow and the vocal cords do not vibrate. Further, improvement is made of the problem (4) because voiceless speech requires only small degrees of mouth opening and closure and does not cause vibration of the vocal cords, reducing the physical load accordingly. Speech modes used in the invention are classified in FIG. 3.

It has been described above that the related techniques do not deal with, in a specific manner, voiceless speech nor speech modes in general. Naturally, as for related speech input techniques, studies have not been made of speech modes of voiceless speech, a whisper, and a small voice. On the other hand, in techniques of detecting speech from the shape of an articulator, it has become clear through experiments that the speech mode is an extremely important concept. In particular, it has turned out that even for speech of the same phoneme or syllable a signal obtained from the shape of an articulator varies with the speech mode that is a voiceless speech mode, a small voice speech mode, an ordinary speech mode, or a loud voice speech mode and the recognition rate of phonemes and syllables may greatly decrease if sufficient care is taken of the speech mode. An object of the present invention is to solve the problem of reduction in recognition rate that is caused by speech mode differences that has not been addressed by the related techniques and, particularly, to increase the recognition rate of voiceless speech that has not been discussed seriously in speech input techniques. To this end, the invention employs the following features.

To increase the rate of speech recognition based on input shape information of an articulator, (1) at least one standard pattern is given to each speech mode;

(2) there is provided means for inputting, to a speech detection apparatus, information of a speech mode of a speech input attempt; and (3) a standard pattern corresponding to input speech mode information is selected and then input speech is detected by executing a recognition process.

The above-mentioned problems can be solved if the speech modes include a voiceless speech mode. Naturally it is necessary to accept input of speech with voice output, and a speech recognition apparatus is required to switch among standard patterns in accordance with the speech mode.

The invention will be described below in more detail.

To solve the above-mentioned problems, the invention provides a speech detection apparatus comprising an articulator shape input section 101 (refer to FIG. 1 for reference numerals, hereinafter the same) for generating input data by measuring a movement of an articulator that occurs when a speaker makes speech from at least part of the articulator and an integument around the articulator; a speech mode input section 102 for allowing input of a speech mode of the speaker; and a speech detection section 103 for detecting the speech by comparing the input data generated by the articulator shape input section based on the speech of the speaker with one kind of standard pattern that is prepared in advance, wherein a speech detection process is executed when the speech mode that is input through the speech mode input section 102 coincides with a speech mode of the one kind of standard pattern.

In this configuration, speech detection is performed only in a prescribed speech mode and hence speech detection is performed in such a manner as to be suitable for the situation. In particular, if setting is so made that detection is performed only in a voiceless speech mode, the speech detection apparatus is advantageous for use in offices and in terms of the load that is imposed on a user.

Speech detection that is most suitable for each situation can be performed by preparing plural kinds of standard patterns and switching the detection mode in accordance with the speech mode. In this case, the plural kinds of standard patterns may include standard patterns of a voiceless speech mode, a voiced speech mode, and unvoiced speech mode. Alternatively, the plural kinds of standard patterns may include standard patterns of a voiceless speech mode and a voiced speech mode.

The speech mode may be determined based on the volume and the noise level of speech of a speaker. In this case, the noise level measurement time may be set at a short period $t_0$ or the noise level may be an average noise level over a long period. Or the noise level may be determined by combining the above two methods.

Where plural kinds of standard patterns corresponding to a plurality of speech modes, respectively, are prepared, speech detection may be performed by selecting two or more kinds of speech modes and using two or more kinds of standard patterns corresponding to the selected speech modes.

In this case, one kind of speech mode may be selected based on a noise level measured in a short period $t_0$ and another kind of speech mode may be selected based on an average noise level that is measured in a long period. (There may occur a case that one kind of speech mode is selected in a duplicated manner.)

There may be used standard patterns of a plurality of voiced speech modes that are featured in loudness, pitch, or length of voice.

The function to be performed in connection with input speech data is switched in accordance with the speech mode that is input through the speech mode input section. For example, the speech modes corresponding to the respective speech modes are a function of allowing input of coded text information, a function of giving an instruction relating to a particular operation, and a function of stopping input. Further, switching may be made automatically, in accordance with the speech mode, among plural kinds of application software.

According to another aspect of the invention, to solve the above-mentioned problems, there is provided a speech detection apparatus comprising an articulator shape input section 101 for generating input data by measuring a movement of an articulator that occurs when a speaker makes speech from at least part of the articulator and an integument around the articulator; a speech mode input section 102 for allowing input of a speech mode of the speaker; and a speech detection section 103 for detecting the speech by comparing the input data generated by the articulator shape input section based on the speech of the speaker with a standard pattern for voiceless speech that is prepared in advance.

With this configuration, speech detection can be performed without a speaker's emitting a noise or imposing an undue load on a speaker. In particular, speech can be detected with high accuracy in the voiceless speech mode because the shape variation of an articulator that is caused by speech is restricted and hence the deviation of the shape is small.

The manner of measuring features of speech is not limited to the case of using movements of an articulator and they can be measured in other various manners.

BRIEF DESCRIPTION OF THE DRAWINGS

FIGS. 6A and 6B show an apparatus according to the specular reflection light spot method that is used in the first to third embodiments of the invention;

FIG. 7 shows a light spot coordinates detection method;

FIG. 11 shows input waveforms of /a/ of four speech modes;

FIG. 13 shows input waveforms of /u/ of four speech modes;

FIG. 16 is a table showing the degrees of similarity between input data (voiceless speech mode) and a standard pattern (voiceless speech mode);

FIG. 17 is a table showing the degrees of similarity between input data (voiceless speech mode) and a standard pattern (small voice speech mode);

FIG. 18 is a table showing the degrees of similarity between input data (voiceless speech mode) and a standard pattern (ordinary speech mode);

FIG. 19 a table showing the degrees of similarity between input data (voiceless speech mode) and a standard pattern (loud voice speech mode);

FIG. 26 is a table showing average values of the degrees of similarity of input data of the small voice speech mode and two standard patterns of the small voice speech mode and the ordinary speech mode;

FIG. 28 is a table showing rough standards of noise levels for respective speech modes;

FIG. 29 shows 10 sentences in the ATR (Advanced Telecommunication Research Institute International) phoneme-balanced sentences;

FIG. 36 shows a Dynamic programming result between input data of the voiceless speech mode and a standard pattern of the voiceless speech mode;

FIG. 37 shows a Dynamic programming result between input data of the voiceless speech mode and a standard pattern of the ordinary speech mode;

FIG. 38 shows a Dynamic programming result between input data of the ordinary speech mode and a standard pattern of the voiceless speech mode;

FIG. 39 shows a Dynamic programming result between input data of the ordinary speech mode and a standard pattern of the ordinary speech mode; and FIG. 40 is a table showing average recognition rates for combinations of the input data of the two speech modes and the standard patterns of the two speech modes.

DETAILED DESCRIPTION OF THE PREFERRED EMBODIMENTS

The present invention will be hereinafter described in detail.

Figure 1:
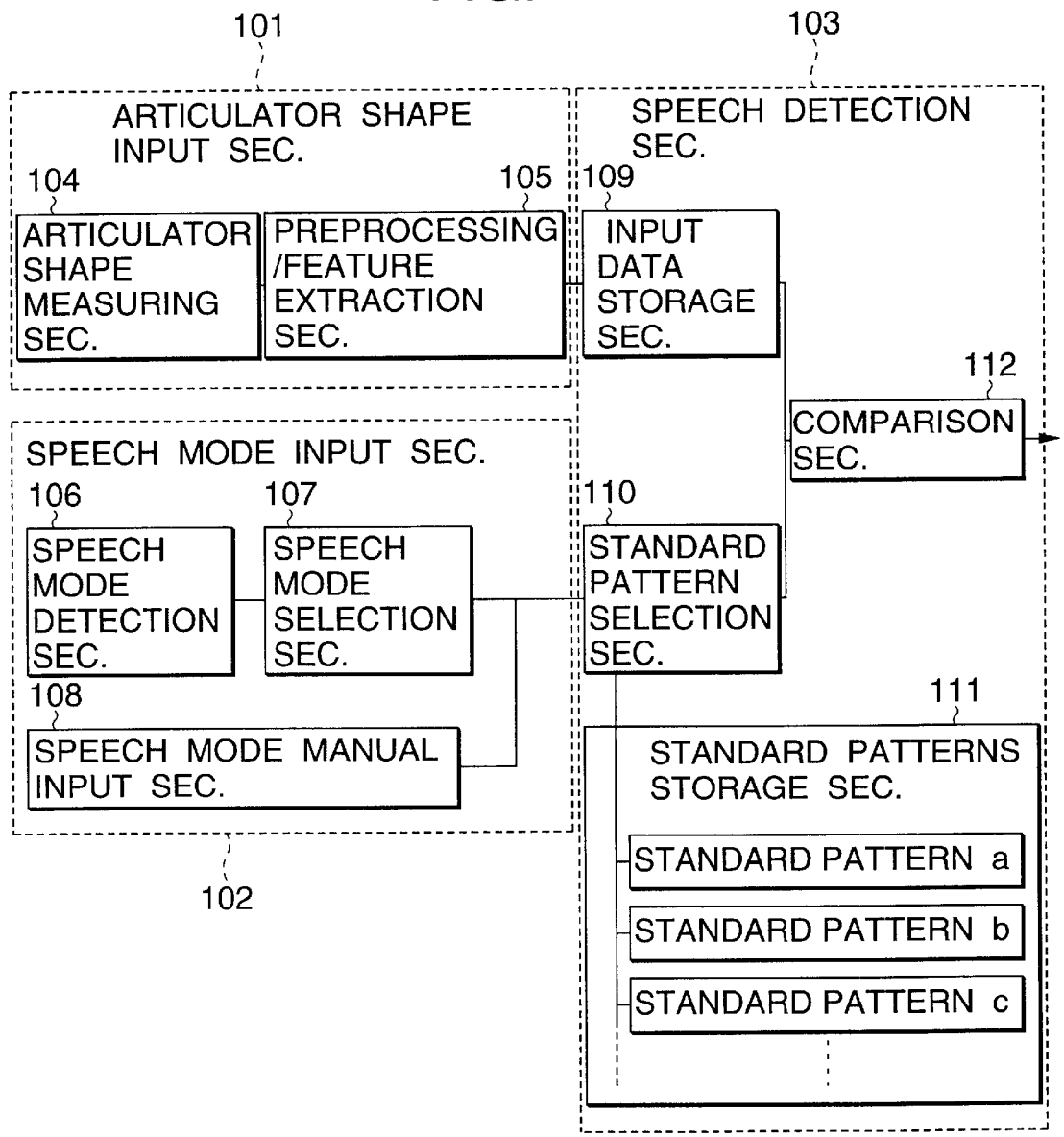
FIG. 1 is a block diagram showing the basic configuration of a speech detection apparatus according to the present invention.

As shown in FIG. 1, a speech recognition apparatus according to the invention generally consists of an articulator shape input section 101 for allowing input of shape information of an articulator, a speech mode input section 102 for allowing input of a speech mode of input data to a speech detection section 103, and the speech detection section 103 for detecting speech information in the input data. The articulator shape input section 101 is composed of an articulator shape measuring section 104 for measuring the shape of the articulator, a preprocessing/feature extraction section 105 for eliminating noise from measured input data and extracting features by performing smoothing and normalization, and an input data storage section 109 for storing processed input data. The input data storage section 109 may be included in the speech detection section 103. The speech mode input section 102 is composed of a speech mode manual input section 108 for allowing manual input of a speech mode, or a speech mode detection section 106 for automatically detecting a speech mode and a speech mode selection section 107. The speech detection section 103 is composed of a standard patterns storage section 111 for storing standard patterns of respective speech modes in advance, a standard pattern selection section 110 for selecting a standard pattern corresponding to the kind of speech mode, and a comparison section 112 for selecting speech in the selected standard pattern closest to input data by comparing the input data with the selected standard pattern, and detects it as a speech candidate.

A description will be made of a technique called a specular reflection light spot method that is mainly used in specific embodiments of the invention, that is, in an apparatus for measuring shape information of an articulator. The specular reflection light spot method will be described in detail in the specific embodiments. This technique has already been proposed by the present assignee in Japanese Unexamined Patent Publication No. Hei. 10-243498.

Figure 4:
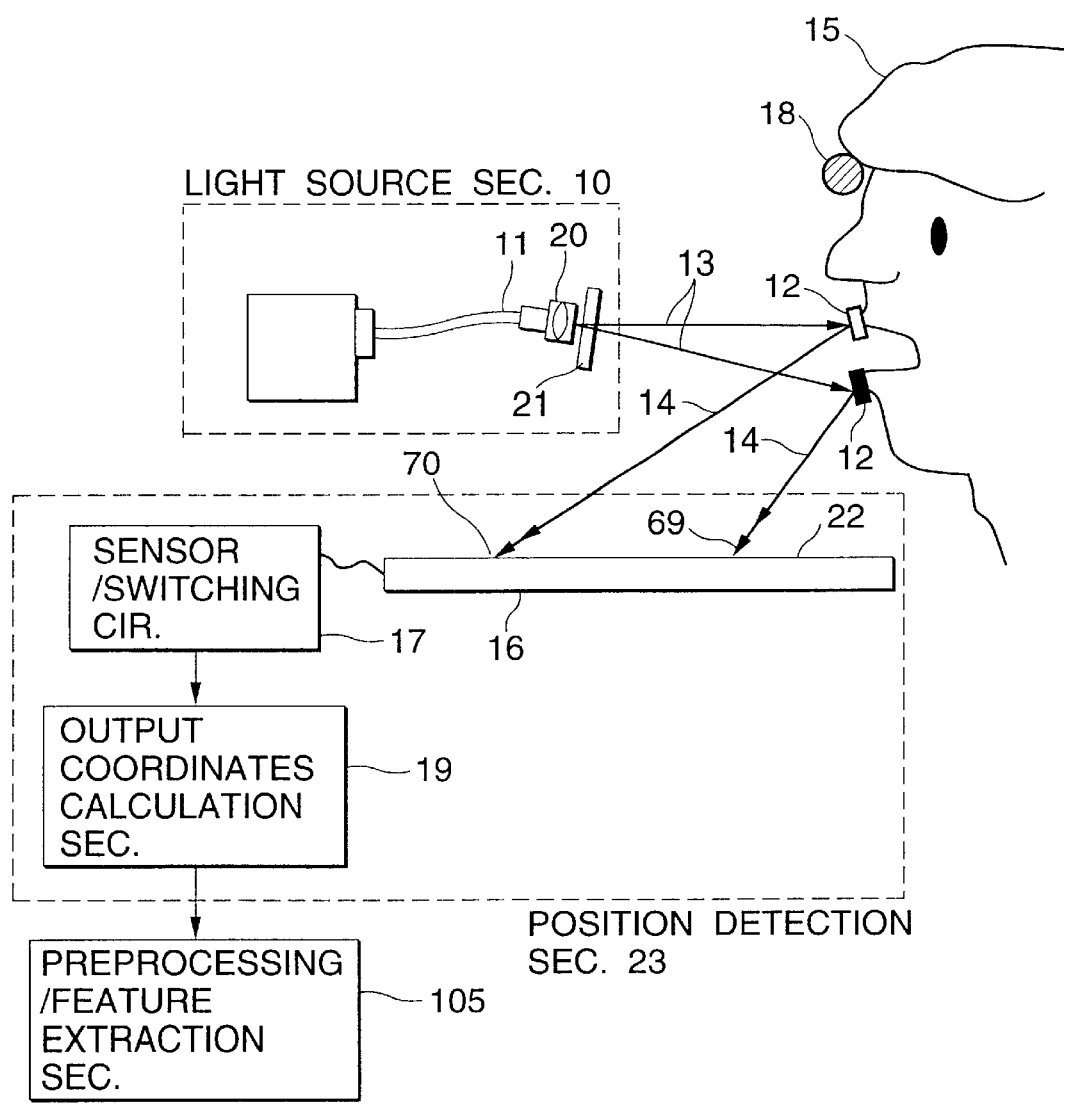
FIG. 4 illustrates an apparatus according to a specular reflection light spot method.
Figure 5:
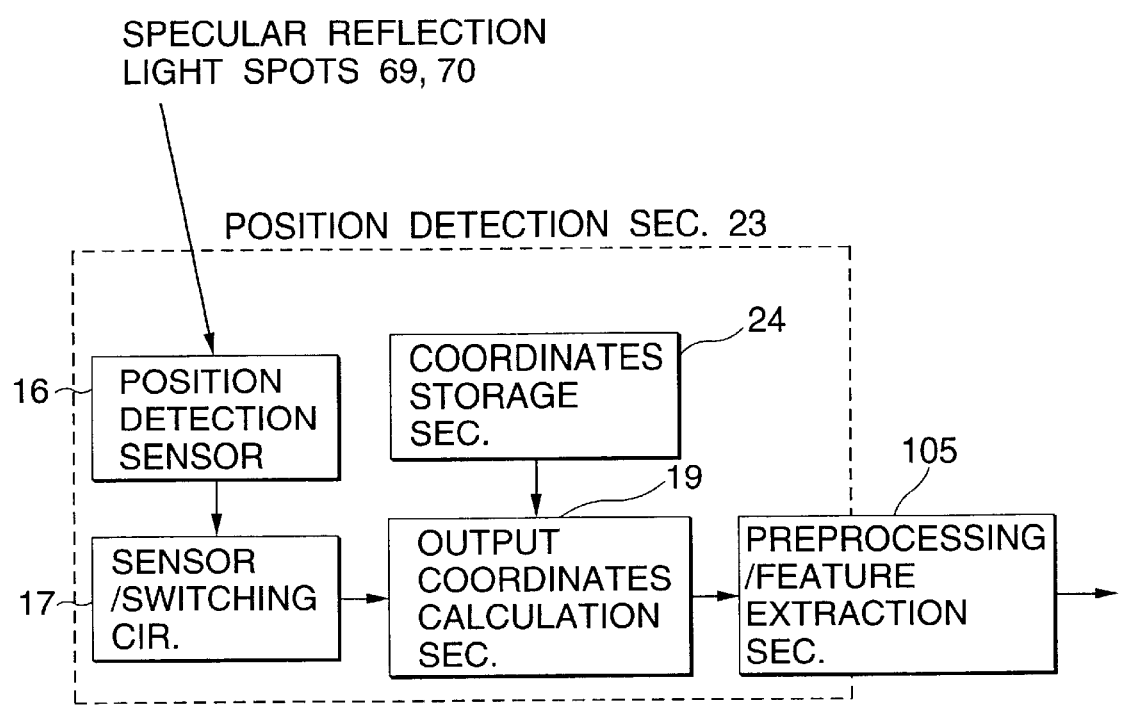
FIG. 5 is a block diagram showing the basic configuration of the apparatus of FIG. 4.

This measuring method improves the articulator shape detection accuracy by attaching specular reflection plates on an articulator of a speaker and an integument around it and enabling measurement of very small angular variations and positional variations of the articulator by a geometrical-optics-based technique. Specifically, as shown in FIGS. 4 and 5, the apparatus is composed of specular reflection plates 12 that are attached to an articulator and a portion around it of a speaker 15, a light source section 10 for applying a light beam 13 (visible light, infrared light, or ultraviolet light) to the specular reflection plates 12, and a position detection section 23 including a position detection sensor 16 for receiving specular reflection light spots 69 and 70 that are formed by light beams 14 specularly reflected by the specular reflection plates 12 and detecting specular reflection light spot projection positions. Although FIG. 4 shows the two specular reflection plates 12, the number of specular reflection plates is not limited to two.

In this configuration, as the speaker 15 speaks, the positions and angles of the specular reflection plates 12 that are attached to the articulator and the integument around it vary.

Therefore, the light beam 13 that is applied by the light source section 10 is uniquely reflected by the specular reflection plates 12 according to the law of reflection and the directions of reflection light beams vary accordingly. The position detection sensor 16 detects the specular reflection light spots 69 and 70 that move on its surface, whereby the positions of the specular reflection light spots 69 and 70 corresponding to the varying shape of the articulator and the portion around it that is caused by vocalization of the speaker 15. Features of a temporal variation and a positional variation are extracted from coordinate-represented information of the detected specular reflection light spot positions. Input speech is classified by performing a judgment by comparing those features with a stored standard pattern indicating features of a temporal variation and a positional variation of a speech signal. Capable of measuring information including very small angular and positional variations of an articulator, this specular reflection light spot method can detect, with high accuracy, shape information of an articulator even in cases of small voice speech and voiceless speech in which the variation of the articulator shape is small.

However, in the invention, the measuring method is not limited to the specular reflection light spot method. Naturally it is possible to employ the measuring techniques described in the "Background of the Invention" section, the optical flow method described in Kenji Mase, Alex Pentrand, "Lip Reading: Automatic Visual Recognition of Spoken Words", Optical Society of America, Proc. Image Understanding and Machine Vision, 1989, and other measuring techniques as long as they can detect movements of an articulator in small voice speech and voiceless speech.

Shape information of the articulator thus obtained is measured, and resulting data and a speech mode at that time point are input to the speech detection section 103. The kind of speech mode may be input either manually or automatically by using a method that will be described in the fourth embodiment. It is also possible to use other methods that will not be described in the fourth embodiment (e.g., speech mode switching is performed based on an instruction that is supplied externally via a network or the like or from the inside of the computer). The speech detection section 103 may be an independent apparatus and output detected speech information to a personal computer or a word processor. Alternatively, part of the functions of the speech detection section 103 may be incorporated in a personal computer as hardware or installed in a personal computer as software.

Figure 3:
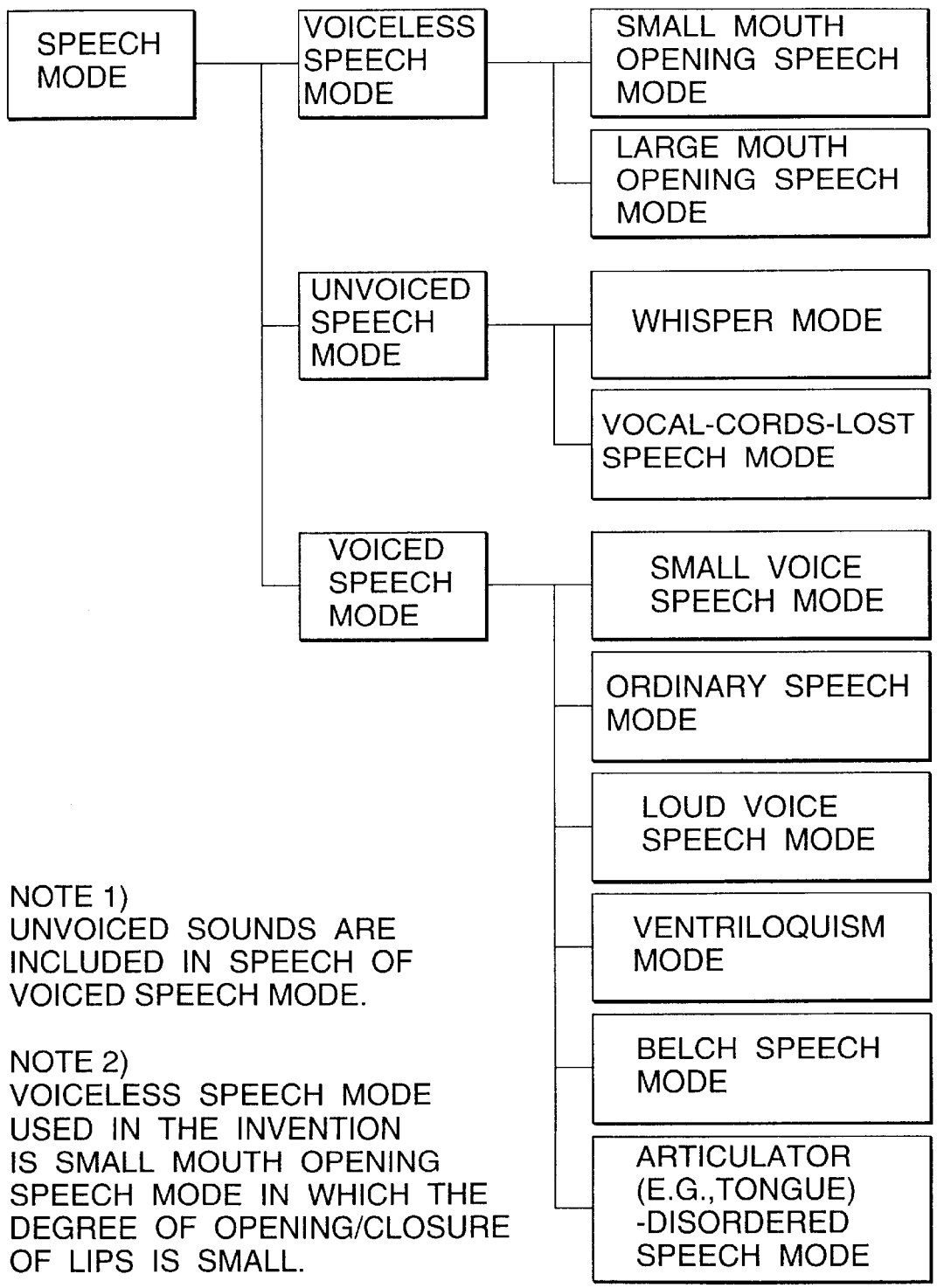
FIG. 3 shows classification of speech modes used in the invention.

Standard patterns stored in the standard patterns storage section 111 of the speech detection section 103 (see FIG. 1) may be ones selected in advance for indefinite speakers or ones for a particular speaker that have been generated by the user himself by inputting predetermined sentences for each speech mode. Similarly, it is possible to update the standard patterns automatically by utilizing the learning function of a neural network classification apparatus. Speech modes of standard patterns that are input at this time may be an arbitrary combination of a voiceless speech mode, a small voice speech mode, an ordinary speech mode, and a loud voice speech mode. As shown in FIG. 3, it is also possible to register, in addition to the above modes, a speaker-specific speech mode dedicated to a persona who lost the vocal cords or a person whose articulator such as the tongue is injured, a ventriloquism mode, and other modes. When information of a speech mode and corresponding speech data are input, the comparison section 112 selects a standard pattern corresponding to the input speech mode, compares the input data with the selected standard pattern, and detects, as a recognition candidate, a speech pattern that is closest to the input data in the standard pattern. At this time, the comparison section 112 executes a process of selecting the best candidate by performing, for example, degree-of-similarity calculations, distance calculations, or neural network calculations between the input data and the elements of the standard pattern.

A technical basis of the above general embodiment, a specific configuration and operation, and examples of improvement in the functional aspect will be described in the first embodiment.

Embodiment 1

This embodiment shows how information that is obtained from the shape of an articulator varies with the speech mode, thereby presenting why the invention uses standard patterns corresponding to the respective speech modes. In an apparatus for performing measurements for this purpose, this embodiment uses, in the articulator shape input section 101, a video camera instead of the position detection sensor 16 shown in FIG. 4 for detecting specular reflection light spot projection positions. The video camera incorporates a two-dimensional CCD that has 488 pixels vertically and 378 pixels horizontally and has an image size of 12.7 mm. FIGS. 6A and 6B show the configuration and arrangement of the detection apparatus. This detection apparatus is composed of a light source section 10, a specular reflection plate 12, a screen 62, and a two-dimensional CCD camera 61. The light source section 10 is composed of a light-emitting diode 65 and a power supply circuit 64 there for. In an experiment, a red light-emitting diode having a central frequency of 580 nm was used so that a specular reflection light spot 63 became visible. Alternatively, an infrared light-emitting diode may be used so as to make beam movements invisible.

Figure 8:
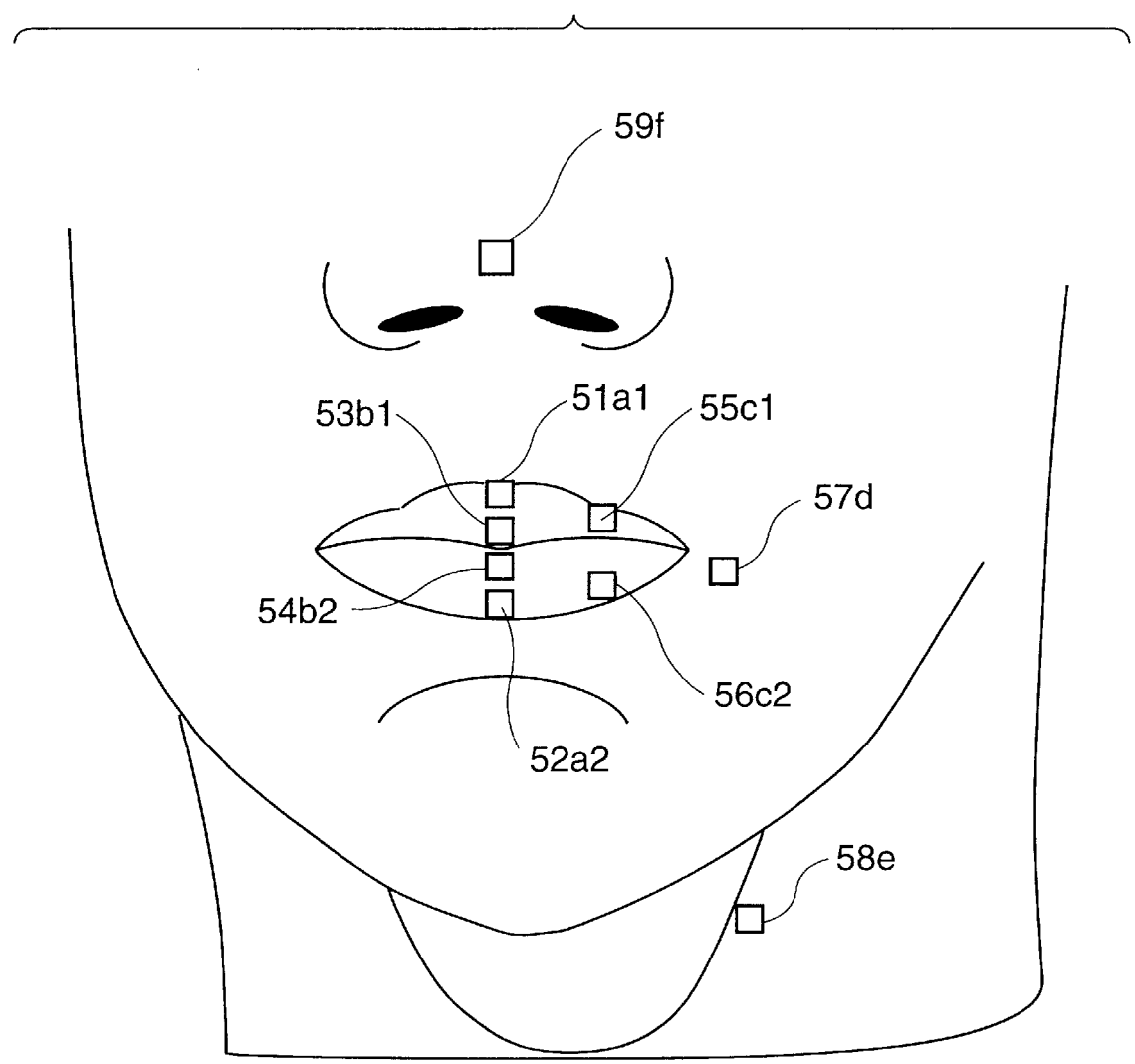
FIG. 8 shows locations of specular reflection plates.
Figure 9:
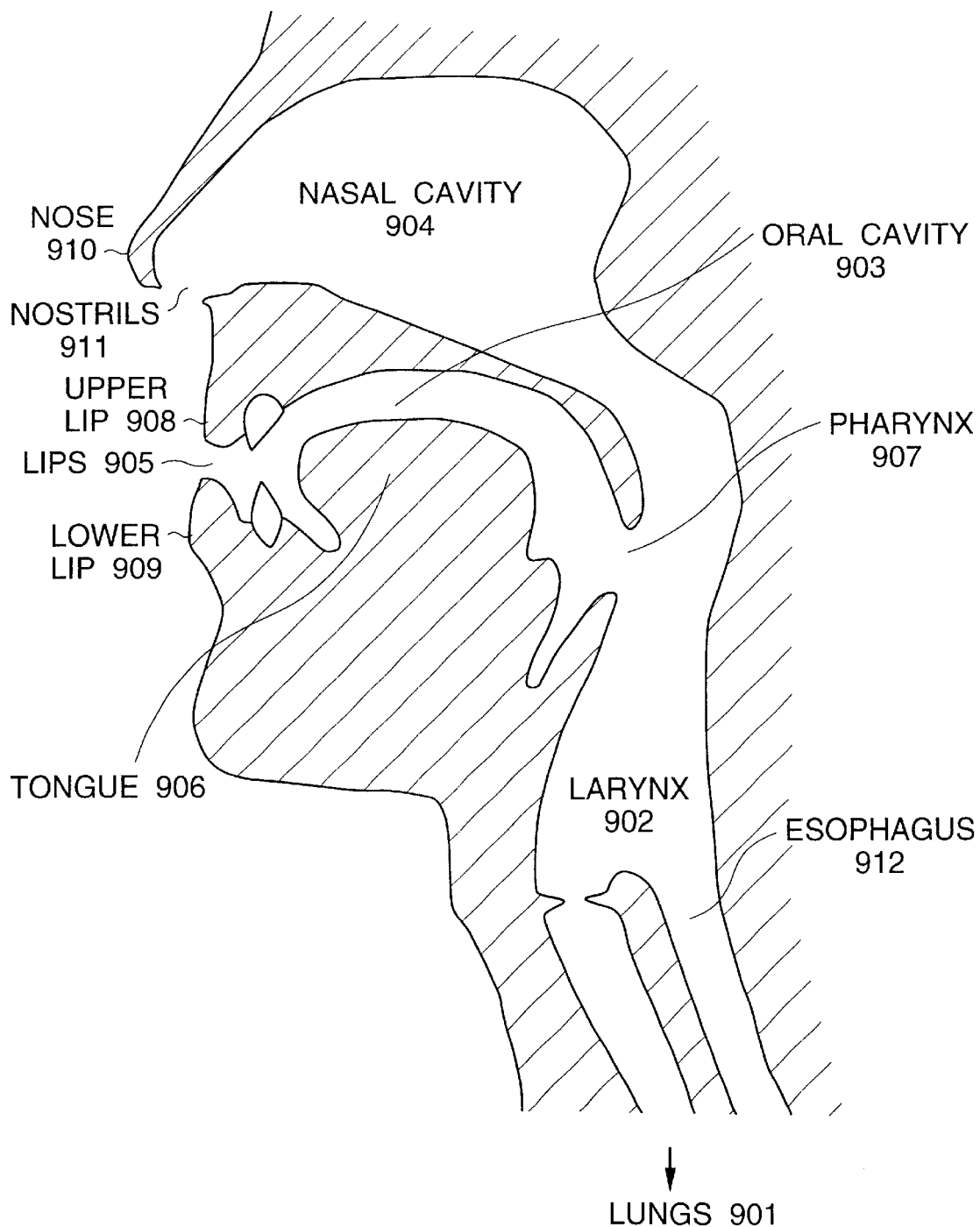
FIG. 9 shows the vocal organs.

A light beam 13 emitted from the light source section 10 illuminates the specular reflection plate 12 that is located at point e (58) in a lower jaw side portion (see FIG. 8). A specular reflection light beam 14 coming from the specular reflection plate 12 and traveling in a direction that depends on the position and the angle of point e is projected onto the screen 62 to form a specular reflection light spot 63. An image of the specular reflection light spot 63 is taken by the two-dimensional CCD camera 61 and resulting signals 74, that is, signals in the fast and slow scanning directions of a two-dimensional CCD sensor 71, are output to an output coordinates calculation section 73 via a CCD driving circuit 72 as shown in FIG. 7. Since the specular reflection light spot 63 projected on the screen 62 is several times brighter than the other, unilluminated portion, in a room only the specular reflection light spot 63 can be extracted by easily eliminating the influence of ambient light by setting a threshold value for the detection of the specular reflection light spot 63. An X-axis coordinate of the specular reflection light spot 63 is determined from the time measured with respect to the time point of a fast scanning start signal of the two-dimensional CCD sensor 71 and its Y-axis coordinate is determined from the time of the slow scanning.

With the above-described apparatus and the arrangement of the specular reflection plate 12, information of the articulator shape was recorded by having a male subject in his 40s pronounce a vowel /a/ while changing the speech mode among a voiceless speech mode, a small voice speech mode, an ordinary speech mode, and a loud voice speech mode. FIG. 11 shows a measurement result. The horizontal axis represents the time frame in which 60 frames correspond to one second. It is seen from FIG. 11 that the amplitude of the input data increases approximately in accordance with the loudness of the voice. It is seen that the amplitude of the input data is detected properly even in cases of the voiceless speech mode and the small voice speech mode through it is smaller than in the ordinary speech mode. A clear difference among the input patterns that is seen from FIG. 11 is that the bumpy variation pattern of the X-coordinate component is more remarkable in the loud speech mode than in the other speech modes. FIGS. 12A to 12D show loci of the specular reflection light spot 63 of the input data in which the X-coordinate component and the Y-coordinate component are plotted on the horizontal axis and the vertical axis, respectively. It is seen from FIGS. 12A to 12D that the locus pattern of the specular reflection light spot 63 varies with the speech mode. FIG. 13 and FIGS. 14A to 14D show measurement results of a case in which another phoneme /u/ was pronounced. These drawings also prove that the locus pattern of the specular reflection light spot 63 varies with the speech mode.

The locus of the specular reflection light spot 63 mainly reflects information of the angular variation of point e (58) in the lower jaw side portion where the reflection plate 12 is attached (see FIG. 8). Therefore, differences in the shape information of the articulator among speech modes can be detected similarly even by other measuring methods as long as the angular variation information of point e (58) in the lower jaw side portion or information that can replace such angular variation information is measured. As described above, this embodiment succeeded in finding the importance of the speech mode that had not been dealt with by the related techniques. This is the basis of using standard patterns corresponding to respective speech modes in the invention.

Incidentally, it should not be construed that the measurement point is not limited to the point e (58) in the lower jaw side portion, but any other portions at which the shape of the articulator such as lips, chin, and cheeks is reflected are applicable.

Effects of using standard patterns for respective speech modes and a relationship among the speech modes will be described in the second embodiment.

Embodiment 2

This embodiment will clarify differences among the respective speech modes. To this end, the degree of similarity will be determined between data of the same speech mode and between data of different speech modes and a relationship between the recognition rate and the speech mode will be shown. An experiment was conducted by using the apparatus having the same configuration as in the first embodiment that is according to the specular reflection light spot method. The subject was a male person in his 40s and the measurement point was point e (58) in a lower jaw side portion (see FIG. 8).

A set of phonemes (or syllables) (/a/, /u/, /za/, /ra/, /ya/, /ma/) whose recognition rates were particularly low in a previously conducted experiment (not described in this specification) in which an average recognition rate of 92.8% was obtained for 19 kinds of phonemes (or syllables) was employed in speech. (The 19 kinds of phonemes (or syllables) are the same as will be shown in the fifth embodiment.)

A set of the above phonemes (or syllables) was acquired two times repeatedly while the speech mode is changed. Four kinds of speech modes, that is, a voiceless speech mode, a small voice speech mode, an ordinary speech mode, and a loud voice speech mode, were employed. To calculate the degree of similarity, X-coordinate components of first-time data were used as a standard pattern and those of second-time data were used as input data.

Next, a recognition method using the degree of similarity that is most frequently used will be described briefly.

With a notation that f (x) represents an input data waveform and g(x) represents a standard pattern waveform, a normalized degree of similarity R (also called a correlation value) is given by one of the following two equations.

$$R = \frac{\int f(x)g(x)dx}{\{\int f^2(x)dx\}^{1/2} \cdot \{\int g^2(x)dx\}^{1/2}} \quad (1)$$

$$R = \frac{(f, g)}{\|f\|\|g\|} \quad (2)$$

Equation (1) is applicable in a case where the waveforms have continuous values and Equation (2) is applicable in a case where the waveforms have discrete values (vectors). In Equation (2), |f| (the underline means a vector) means the norm of f, that is, the square root of the sum of the squares of elements $f(x_i)$ for $x_i$, and indicates the distance from the origin in the n-dimensional space.

Figure 15:
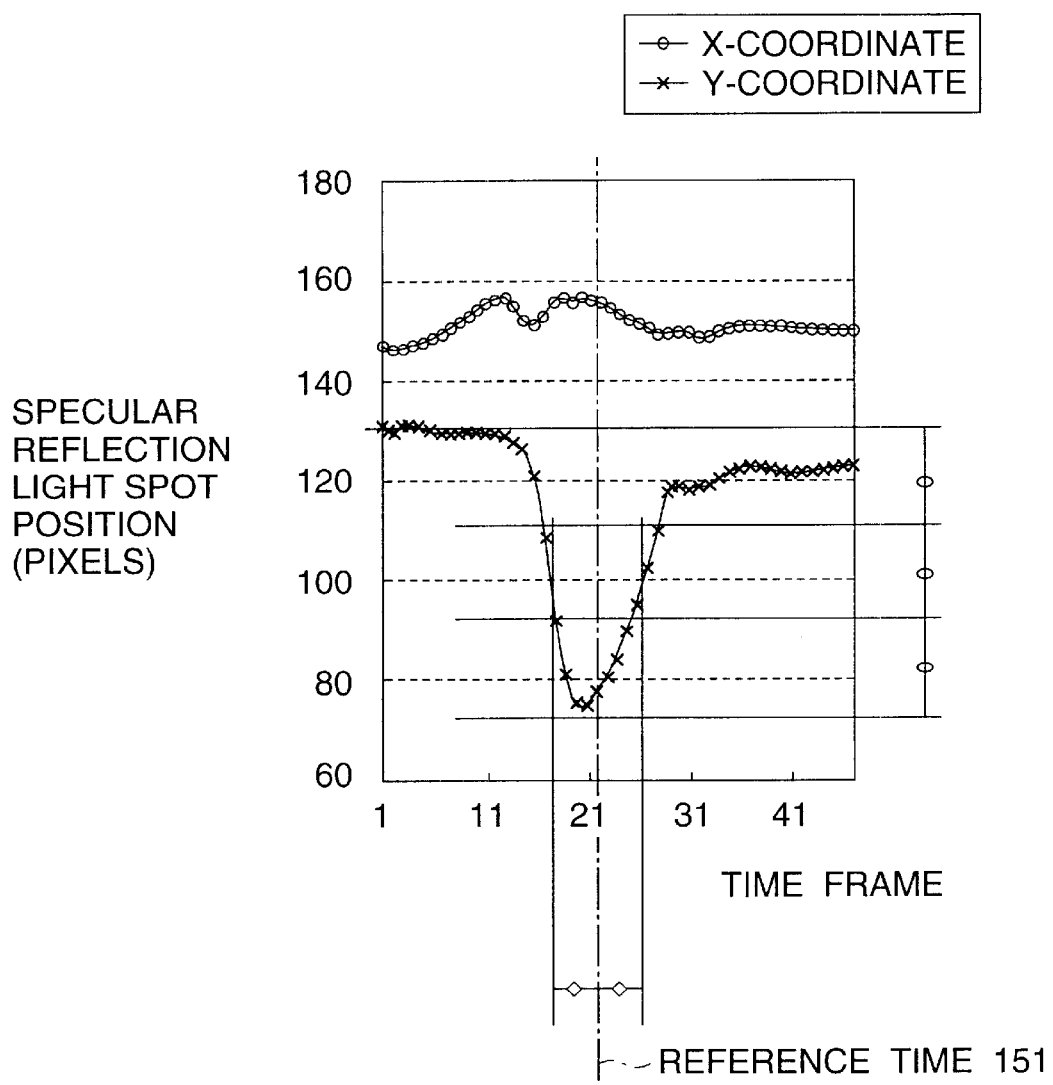
FIG. 15 illustrates a method of determining the reference of the phase of speech data.

This method was applied to the specular reflection light spot method in the following manner. Light spot data obtained from speech of each syllable is represented by a set (vector) of discrete values of respective time frames. Therefore, Equation (2) was employed in the experiment. To compare two data by using Equation (2), it is necessary to equalize the phases and the lengths of speech data. Reference time 151 for the phase equalization was set at the center of the width taken at the ⅓ value from the bottom of the fall portion of the Y-coordinate component of speech data (see FIG. 15). The data length of a phoneme (or syllable) was so unified as to be a 31-dimensional vector consisting of first-half 16 frames and second-half 15 frames including the reference time. The degree of similarity was determined between input data and templates of 48 phonemes (or syllables) in total including phonemes of the four speech modes and closest phonemes (or syllables) of standard patterns were employed as recognition results of the input data.

Figures 20, 21:
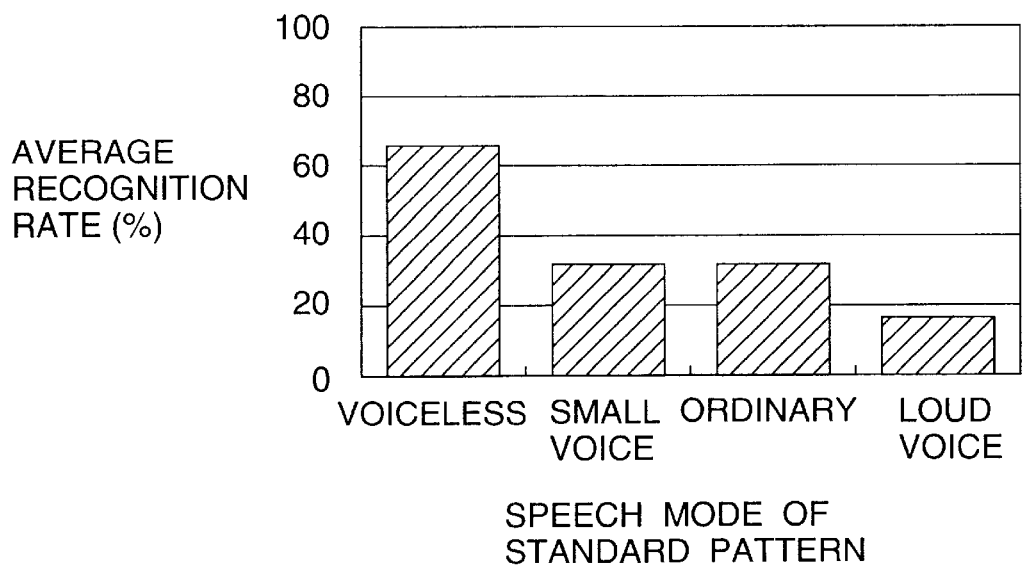
FIG. 20 is a table showing average recognition rates for combinations of speech modes.
FIG. 21 is a graph showing average recognition rates of combinations of the input data of the voiceless speech mode and the standard patterns of the respective speech modes.

FIGS. 16 to 19 are tables showing example results. These tables show the degrees of similarity that were calculated between a standard pattern of each of the four speech mode and input data of the voiceless speech mode. In each table, the degree-of-similarity value that is closest to 1.0 for each input data is underlined. Phonemes (or syllables) of each standard pattern corresponding to the underlined values are phonemes (or syllables) as recognition results. The average recognition rate of each set of the input data of the voiceless speech mode and the standard pattern of each speech mode is determined based on what number of input data (among the six input data) have been recognized correctly. FIG. 20 summarizes thus-determined results of average recognition rates of the input data of the four speech mode. FIG. 20 has a general tendency that the recognition rate is high in the main diagonal elements. Among the main diagonal elements, the element in which both of the input data and the standard pattern are of the loud voice speech pattern has the highest recognition rate and the element in which both of the input data and the standard pattern are of the voiceless speech mode has the second highest recognition rate. There is another general tendency that the recognition rate becomes lower as the speech modes of the input pattern and the standard pattern become less similar. For example, FIG. 21 is a graphical representation of that part of FIG. 20 which corresponds to the input data of the voiceless speech mode. It is seen from FIG. 21 that the recognition rate of the experiment is made twice that of the related technique by employing the standard pattern of the voiceless speech mode for the input data of the voiceless speech mode.

However, the above relationship is not clear in the small voice speech mode and the ordinary voice speech mode; the detection accuracy of speech information was relatively low even when the standard pattern of the same speech mode as the input data was used. There were cases that a higher recognition rate was obtained when a standard pattern of a speech mode (small voice, ordinary, or loud voice) that was different from the speech mode of input data was used, as long as the speech mode used was a voiced one. These points will be described in the third embodiment.

To summarize the above, it has been confirmed that in the voiceless speech mode and the loud voice speech mode the speech detection accuracy can be improved by equalizing the speech modes of input data and a standard pattern. In particular, this embodiment has shown that when the input data is of the voiceless speech mode, by providing the means for switching the speech mode of a standard pattern (to the voiceless speech mode), the recognition rate of phonemes (or syllables) can be made two times that of the case where the speech mode of a standard pattern is fixed to the ordinary speech mode (see FIG. 21). Also, in the cases of the small voice speech mode and the ordinary speech mode, although selecting a standard pattern of the same speech mode as that of input data and using the selected standard pattern for the recognition did not produce the best result, it is meaningful in that it is better than using a standard pattern of a much different speech mode. It goes without saying that making the speech modes of input data and a standard pattern the loud speech mode is included in the invention though its value in terms of industrial use is low because of annoyance to nearby people. It is also included in the invention to equalize the speech modes of input data and a standard pattern in accordance with the speech mode of a person whose articulator is disordered.

Embodiment 3

As shown in the second embodiment, the average recognition rate that is obtained with input data and a standard pattern of the same speech mode is high in the loud speech mode and the voiceless speech mode and the average recognition rate is low when a standard pattern of a speech mode that is different from the speech mode of input data. This is explained as follows. In loud voice speech, although the speech length can be adjusted, the loudness is difficult to adjust because it is at the saturation level. Further, there is no sufficient margin to produce a variation in pitch. On the other hand, in the voiceless speech mode, because the vocal cords themselves do not vibrate, the pitch and the loudness of a voice cannot be adjusted. That is, it is considered that the average recognition rate is high in these two speech modes because the shape of the articulator during speech is restricted and hence a large deviation in the articulator shape is less likely to occur. In contrast, in speech of small voice or ordinary voice or voiced speech whose volume is around the volume of such speech, emotional and expressive speech can be performed by freely changing the loudness, pitch, and length of voice (called super-phoneme elements). It is considered that, resultantly, in speech of small voice or ordinary voice or voiced speech whose volume is around the volume of such speech, a large deviation occurs in the articulator shape and the average recognition rate decreases even if the speech modes of a standard pattern and input data are the same. However, it is considered that for the same reason the average recognition rate does not decrease to a large extent even if the speech mode of a standard pattern and input data are somewhat different from each other. The super-phoneme element is a feature of the above kind in speech that appears in such a manner as to bridge successive single sounds (bunsetsu elements). Although the super-phoneme element specifically means a tone, intonation, accent, or length of a sound, it boils down to (is decomposed into) the pitch, loudness, and length of a voice.

Figure 22:
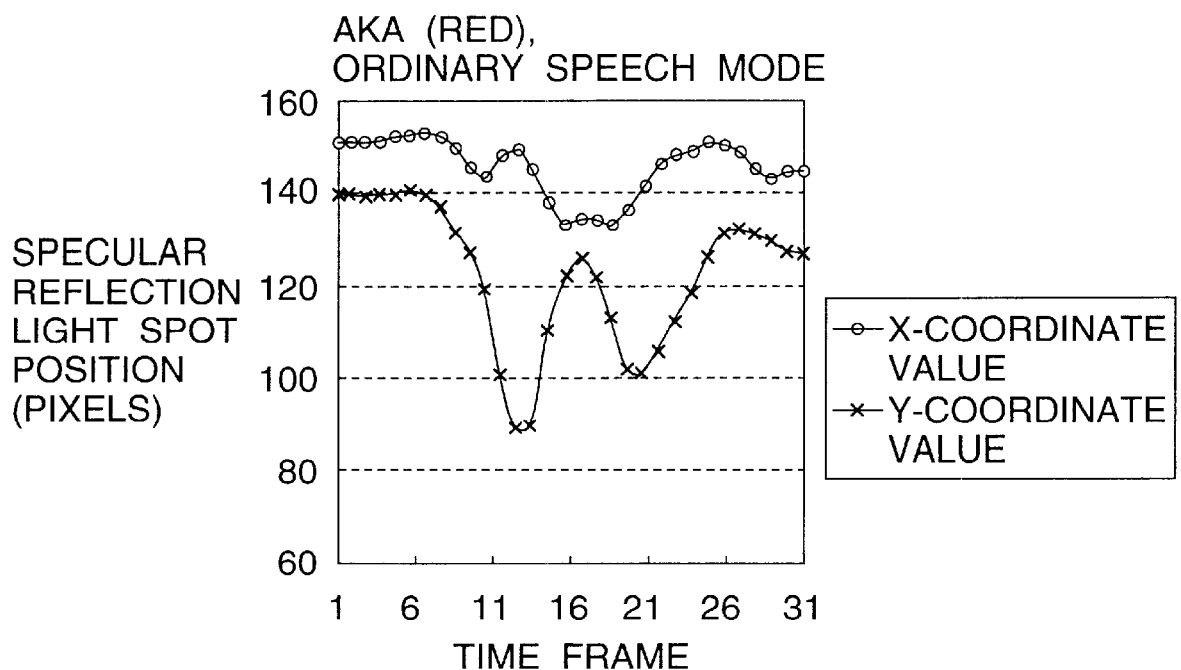
FIG. 22 shows a speech pattern of aka (red) in the ordinary speech mode.
Figure 23:
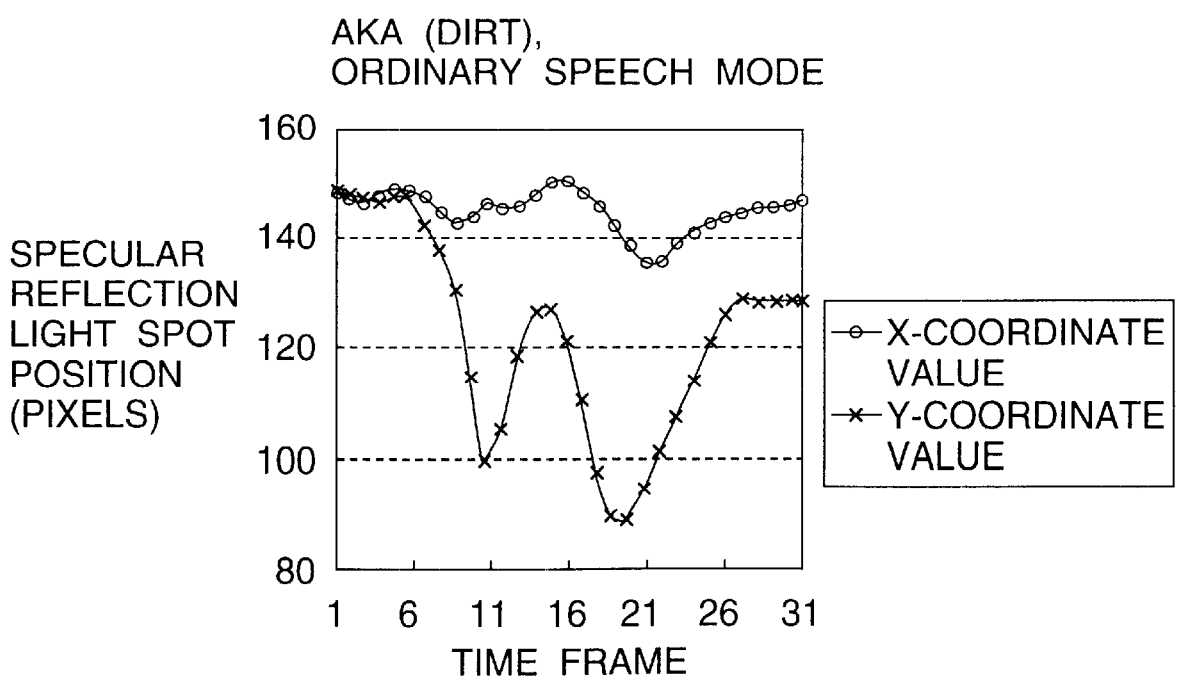
FIG. 23 shows a speech pattern of aka (dirt) in the ordinary speech mode.
Figure 24:
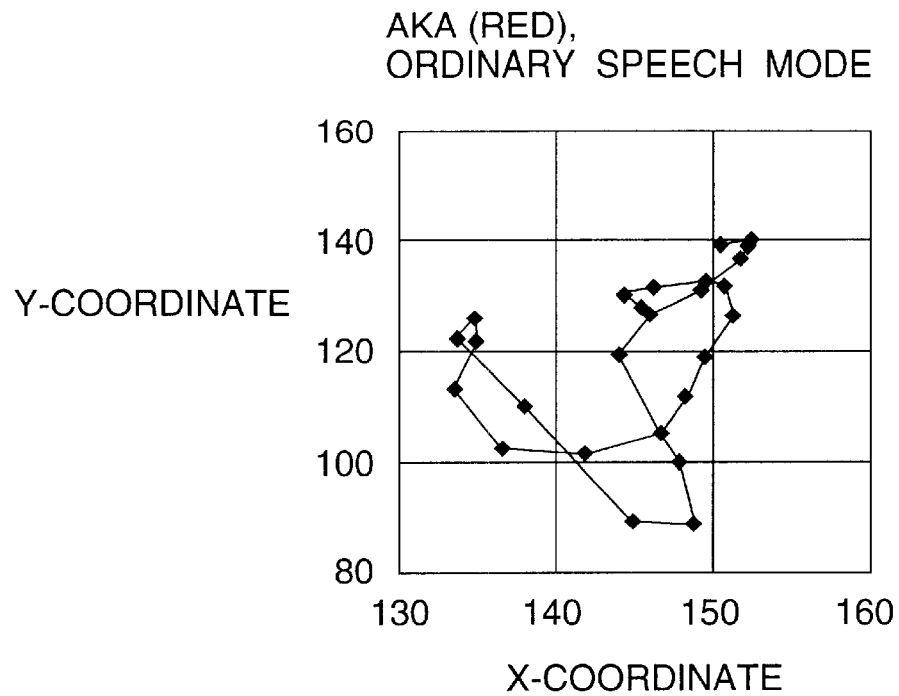
FIG. 24 shows a speech pattern locus of aka (red) in the ordinary speech mode.
Figure 25:
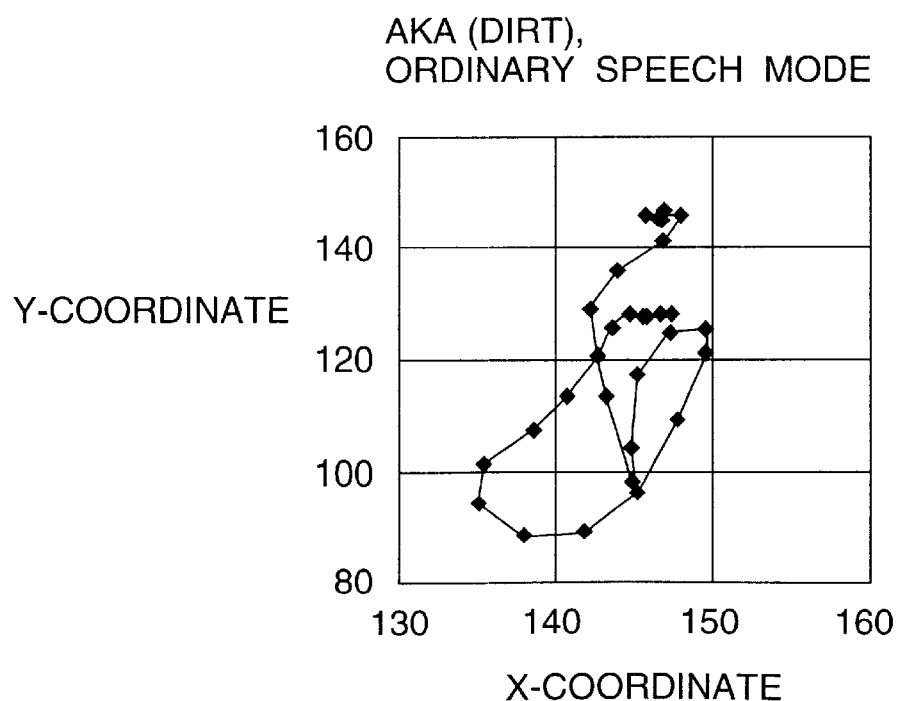
FIG. 25 shows a speech pattern locus of aka (dirt) in the ordinary speech mode.

In this embodiment, a measurement is made of how the feature in speech called the super-phoneme element influences the pattern of speech data in the ordinary speech mode and a measurement result is applied to the speech detection apparatus of the invention. The same apparatus as in the first and second embodiments was used as the articulator shape input section 101. An experiment was conducted according to the specular reflection light spot method (see FIG. 8). The subject was a male person in his 40s and the measurement point was point e (58) in a lower jaw side portion. Sets of Japanese words used were (aka (red), aka (dirt)), (saku (rip), saku (fence), (hashi (chopsticks), hashi (bridge)), and (hyo (leopard), and hyo (table)). Although patterns of speech data belonging to the same set (parenthesized) are similar, they had large differences in shape due to differences in pitch. For example, FIGS. 22 and 23 show time-series data of speech results of aka (red) and aka (dirt). To make the differences between the two data clearer, FIGS. 24 and 25 show loci of a specular reflection light spot. As exemplified by these drawings, it has turned out that the articulator shape greatly varies with the pitch in the ordinary speech mode in which super-phoneme elements are most easily used in speech. This indicates a possibility that data obtained from the articulator shape greatly varies even if a speaker intends to speak in the same manner.

Figure 27:
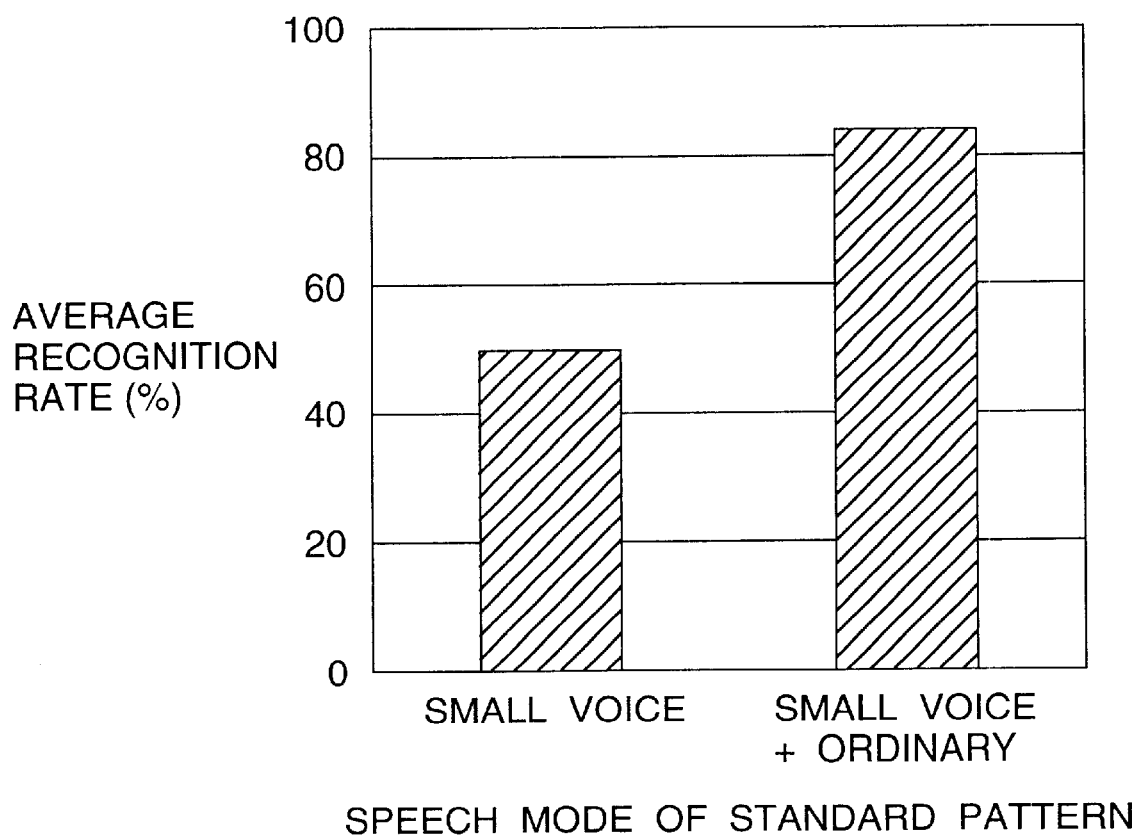
FIG. 27 is a graph showing average recognition rates of the input data of the small voice speech mode.

In the invention, to absorb a pattern deviation due to differences of super-phoneme elements, it is proposed to intentionally use a plurality of standard patterns having different characteristics for the same speech mode. As an example of this proposal, it will be shown below that the recognition rate can be increased by using standard patterns that are different in loudness (ordinary speech and small voice speech) in a composite manner. While these standard patterns are varied in loudness, it is considered that other super-phoneme elements also vary within their ranges of deviation. FIGS. 26 and 27 show results of a calculation in which the degrees of similarity were calculated in a case where the small voice speech obtained in the second embodiment was used as input data and the standard patterns of the small voice speech mode and the ordinary speech mode were used and then an average recognition rate was calculated. It is seen that the recognition rate was improved to 83.3% from 50% that is the value obtained by calculating the degrees of similarity by using the standard pattern of the same speech mode as of the input data. It has been proved that for voiced speech whose volume is around the volume of the ordinary speech mode the recognition rate of the speech can be improved by additionally using the standard pattern of an adjacent speech mode.

Embodiment 4

The second and third embodiments showed the effects of switching the speech mode of a standard pattern used in the speech detection section 103 or using standard patterns of a plurality of speech modes there in accordance with the speech mode of input data. To perform such an operation, it is necessary to input the speech mode of input data to the speech detection section 103 in advance. The simplest and most reliable method there for is that the speaker inputs a speech mode manually by, for example, depressing a prescribed key of a keyboard. Where speech is input to a personal computer 200, one conceivable method is that the computer 200 designates a mode of speech to be input next. However, in actual use of the speech detection apparatus of the invention, it is cumbersome and inconvenient to perform such a manipulation or operation each time. In view of this, this embodiment will propose an apparatus for automatically detecting a speech mode and describe a new function using that apparatus (See FIG. 2).

Figure 2:
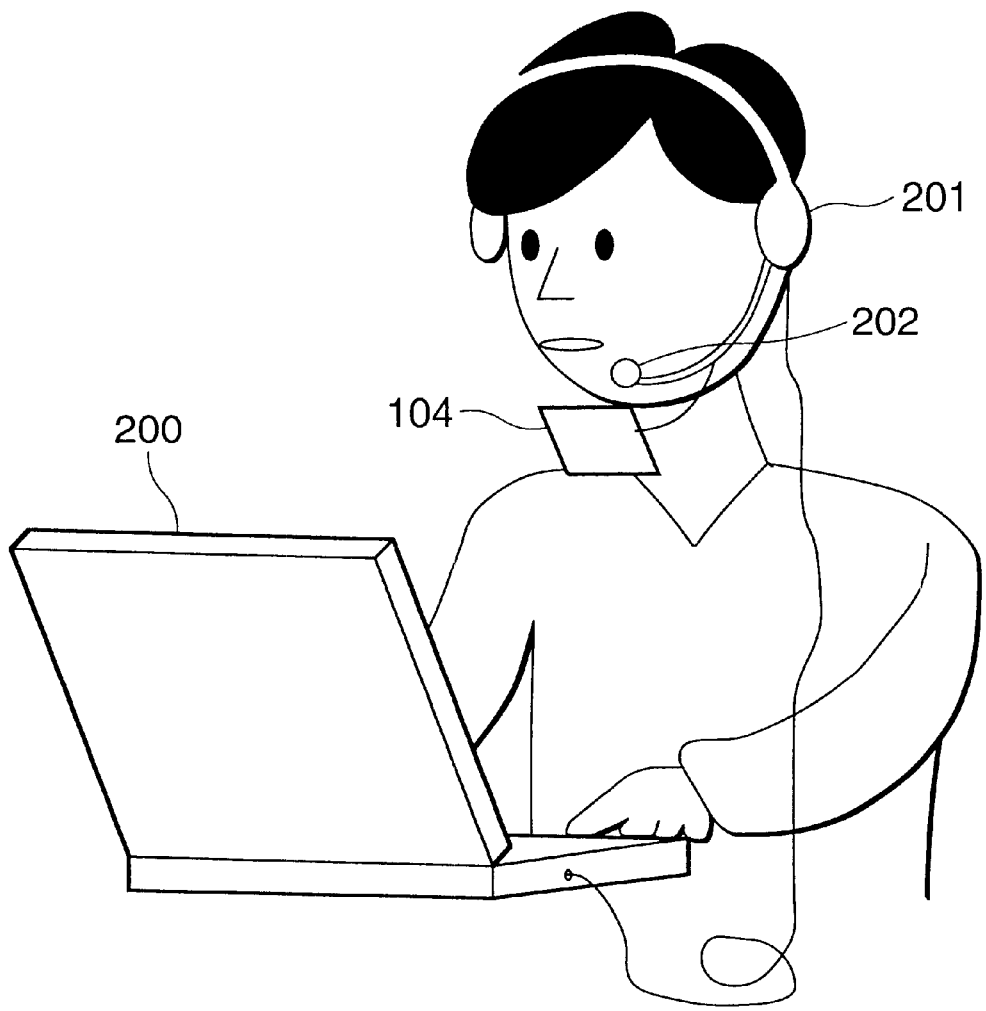
FIG. 2 shows an example of the fourth embodiment of the invention.

As a first method for the above purpose, a specific example of a method of measuring the loudness of a voice by setting a microphone 202 in front of the mouth of the speaker and detecting a speech mode based on a measurement level will be described. FIG. 2 shows an example in which speech is input to the personal computer 200 via a speech board from the microphone 202 that is integrated with a headset 201. This example is directed to a speech detection apparatus as one mode of actual use of the invention in which articulator shape information is input to the personal computer To determine a speech mode based on the volume of speech obtained, first it is necessary to determine the loudness of voice corresponding to each mode. To this end, indices for evaluation of the volume of speech were determined as shown in FIG. 28 by using a noise meter of characteristics-A as prescribed by JIS C1502. The microphone 202 attached to the headset 201 was of a dynamic type, had an operable frequency range of 300 to 20,000 Hz, and was unidirectional. A noise level measurement was conducted in a sound-proof chamber in such a manner that the microphone of the noise meter was disposed at a position 1-m distant from a speaker who was mounted with the headset 201. While a measurement was performed by the noise meter, the output voltage of the microphone 202 of the headset 201 was monitored. Each characteristic shown in FIG. 28 was measured by having the speaker read, in each speech mode, 10 sentences (see FIG. 29) in the ATR phoneme-balanced sentences to produce noises.

Figure 30:
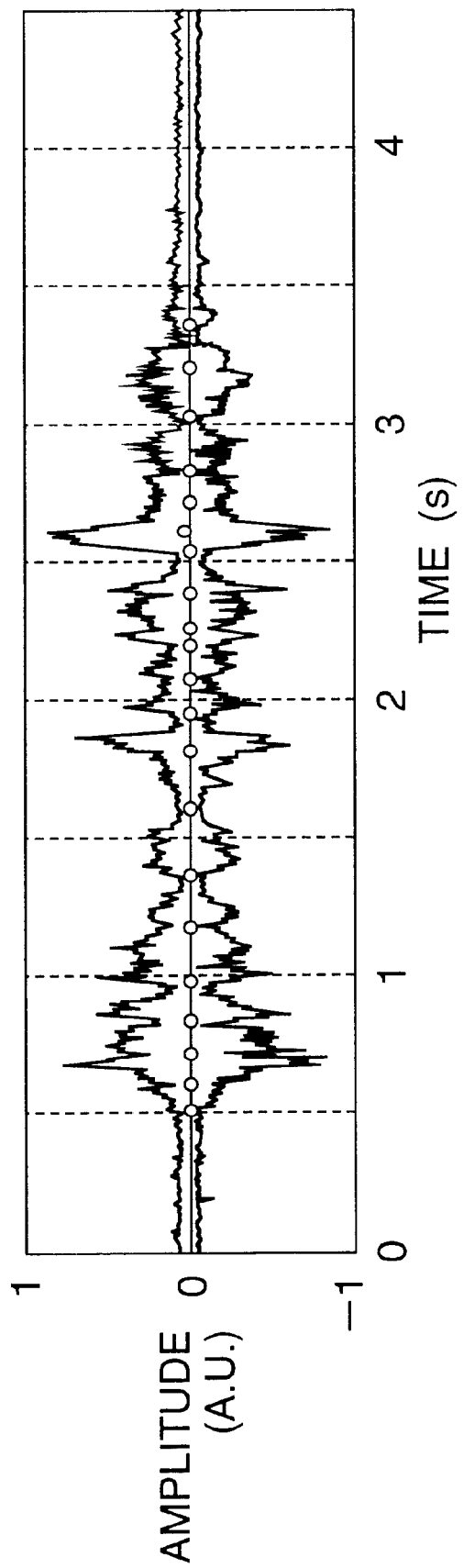
FIG. 30 shows an example of sound data of an ATR phoneme-balanced sentence.

FIG. 30 shows an example of sound data obtained in the above manner. The microphone 202 of the headset 201 was fixed so that its relationship with the mouth did not vary, and an output value that was obtained in this state was calibrated by an output value of the noise meter. Although the output value of the noise meter and that of the microphone 202 of the headset 201 were generally in proportion to each other, they were not in proportion to each other for certain kinds of contents of speech. This is considered due to the type and directivity of each microphone and influence of respiratory air flows of vocalized phonemes. Two male subjects in their 30s and 40s had a large difference in speech level; the noise level in the ordinary speech mode varied by a factor of about 2. In the voiceless speech mode, this phenomenon did not occur and the noise level was 0 phon for the two subjects.

To provide another characteristic to be used for detecting a speech mode, FIG. 28 shows maximum opening sizes along the center line of the lips that were measured visually by using a scale when the mouth opened and closed. FIG. 28 also shows presence/absence of a respiratory air flow and presence/absence of vocal cords vibration as features of speech. It is seen that these features form qualitative differences among voiceless speech, unvoiced speech (a whisper or the like), and voiced speech (small voice, ordinary, loud voice, etc.). Although this embodiment does not deal with some of the speech modes shown in FIG. 3 (other than the whisper mode), it goes without saying that these speech modes can be detected in similar manners and are also included in the detection subject modes of the invention.

A description will be made of a method of detecting a speech mode from an output level obtained by the microphone 202 of the headset 201 after the above-described preparation. In this example, for the sake of convenience, a converted value of an output of the microphone 202 as calibrated by an output value of the noise meter was used as a noise level (phon).

Although usually a noise level is indicated in terms of an average value of a noise, in actual detection of a speech mode there is no time to use an average value because a real-time response is required. Therefore, a short-term noise level detection method was used in which a maximum value of the noise level during a short period (t0: 200 ms in this embodiment) in the initial stage of voice input is detected and the speech mode is switched if the detected maximum value exceeds a predetermined threshold value.

Figure 31:
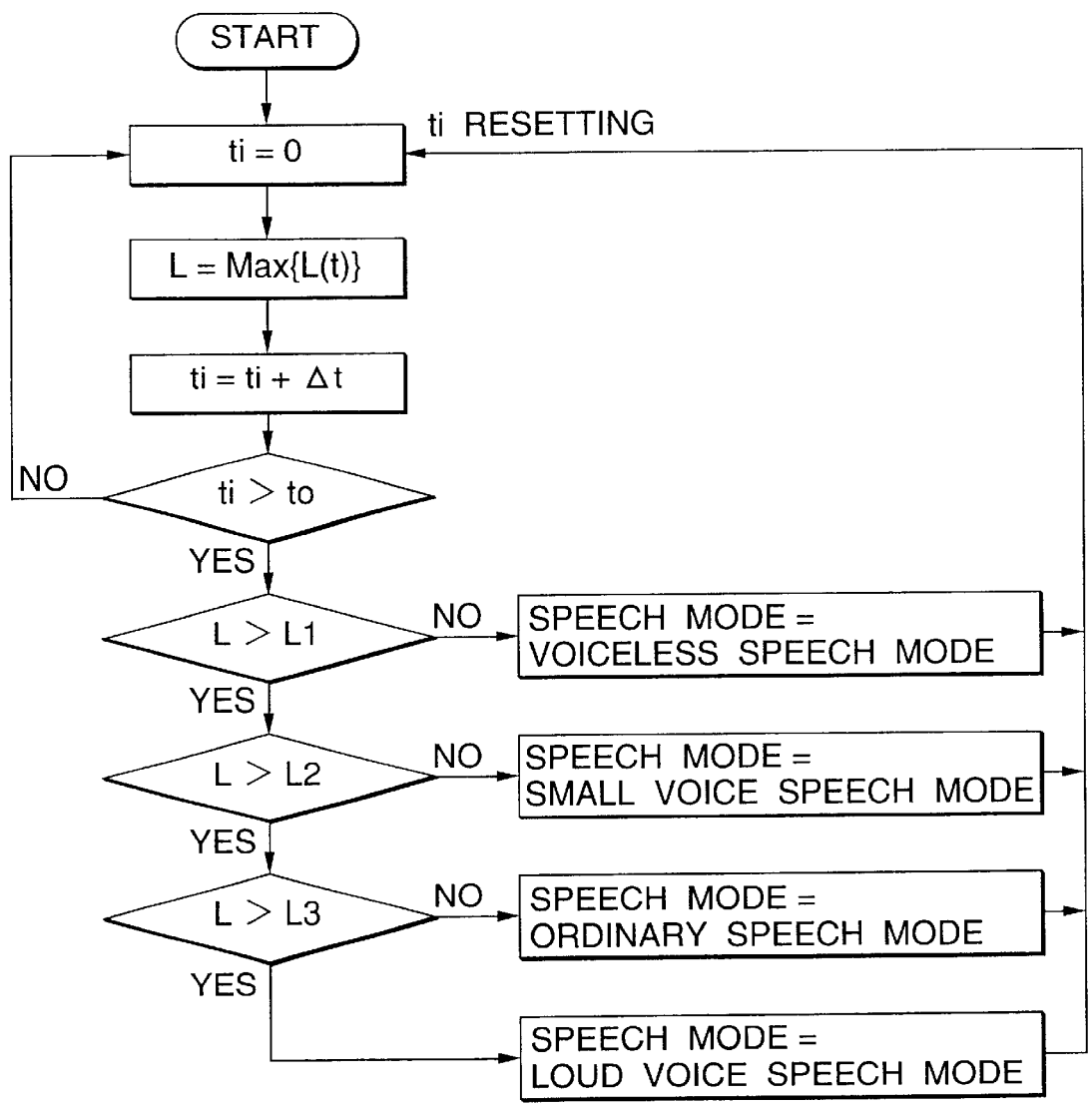
FIG. 31 is a flowchart of speech mode switching.

Specifically, a method shown by a flowchart of FIG. 31 was used. If a maximum value of the noise level (L(t)) during a predetermined period (t0: 200 ms in this embodiment) in the initial stage of voice input is smaller than a first threshold value (L1:10 phons in this embodiment), the starting speech mode is set to the voiceless speech mode. If information of the articulator shape is input, the standard pattern of the voiceless speech mode is used for detection. If the noise level is higher than the first threshold value and lower than a second threshold value (L2:35 phons in this embodiment), the speech mode is set to the small voice speech mode and information of the articulator shape is detected by using the standard pattern of the small voice speech mode. Similarly, if the noise level is higher than the second threshold value and lower than a third threshold value (70 phons in this embodiment), the speech mode is set to the ordinary speech mode and information of the articulator shape is detected by using the standard pattern of the ordinary speech mode. If the noise level is higher than the third threshold value, the speech mode is set to the loud voice speech mode and information of the articulator shape is detected by using the standard pattern of the loud voice speech mode.

An experiment was conducted by using the method of FIG. 31 according to the specular reflection light spot method. The subject was a male person in his 40s and the measurement point was point e (58) in a lower jaw side portion (see FIG. 8). The same set of phonemes (or syllables) (/a/, /u/, /za/, /ra/, /ya/, /ma) as used in the second embodiment was used as speech contents, and speech was input randomly two times for each speech mode. Input data of shape information and data indicating a selected speech mode were stored in a memory of the personal computer 200, and phonemes (or syllables) were detected by using the standard pattern corresponding to the selected speech mode. As a result, the average recognition rate could be improved to 62.5% from 50.0% that was obtained in a case where the standard pattern was fixed to that of the ordinary speech mode. Although this improvement appears not very large, it is noted that the value 62.5% is an average over the four speech modes; a profound effect was obtained for a certain speech mode as in the case of the second embodiment. Effectiveness of the speech mode switching has thus been proved.

Figure 32:
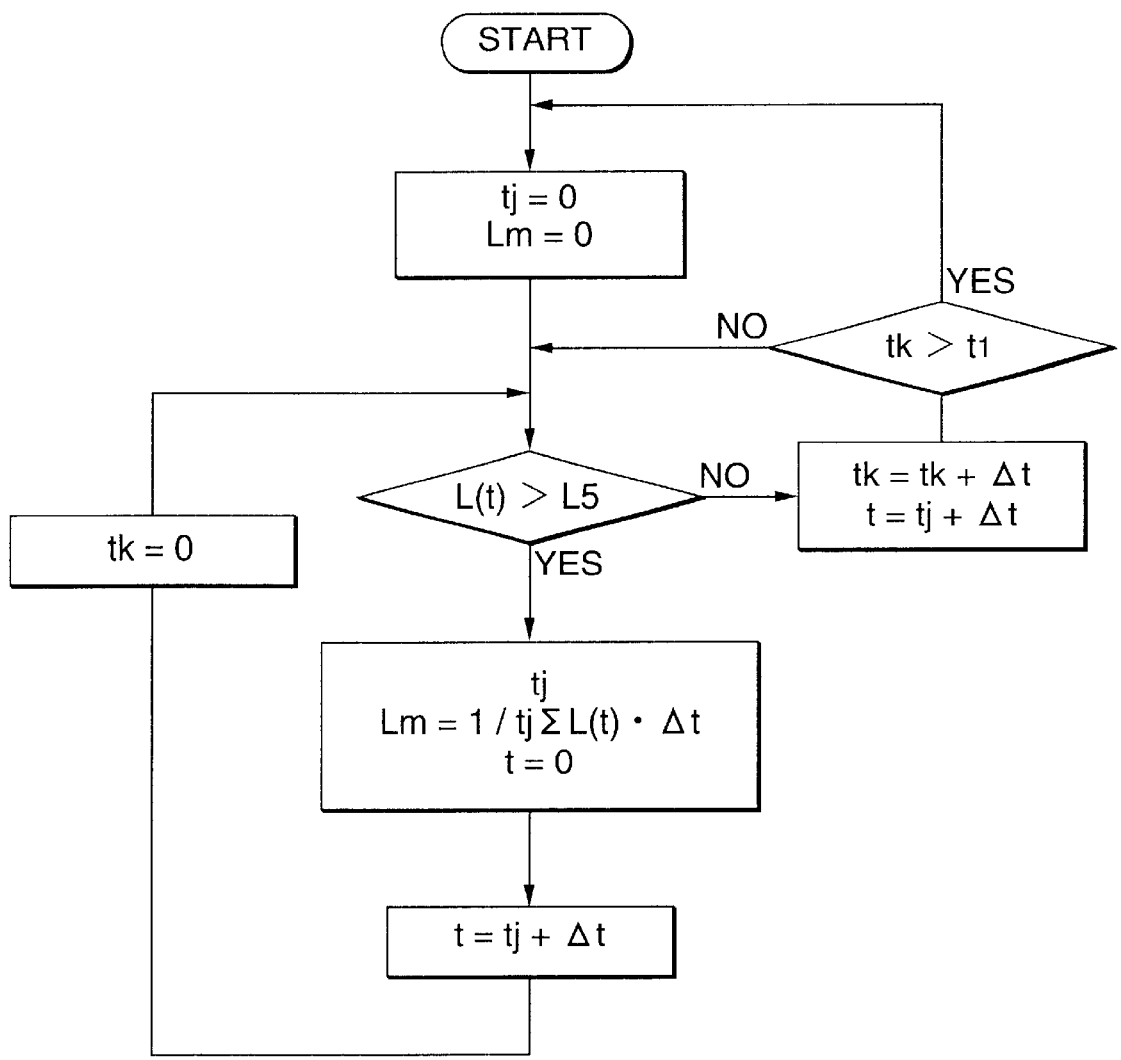
FIG. 32 is a flowchart of average noise level calculation.

On the other hand, in ordinary speech, it is less likely that the speech mode is changed suddenly during continuous speech. It is expected that a sudden change of the speech mode is in most cases due to large noise from the environment. To prevent erroneous switching of the speech mode due to noise, a long-term average noise level detection method is employed. In this method, in a case where speech is being input continuously, a speech mode is selected by calculating and monitoring an average noise level Lm. Specifically, if during speech the noise level does not become lower than a fifth threshold value (L5: 10 phons in this embodiment) for a predetermined period ($t_1$: 500 ms in this embodiment), the average value of the noise level is calculated continuously and a speech mode is determined based on its average value. Threshold values for the speech mode determination can be set by using, as references, the values shown in FIG. 28. If the noise level does not exceed the fifth threshold value L5 in the predetermined period $t_1$ without input of information of the articulator shape, an average noise level is newly calculated with a judgment that the speech has been suspended. FIG. 32 shows this method.

However, if it is assumed that the speech mode does not change suddenly even after the speech suspension, a method is conceivable in which an average noise level corrected value Lm' is newly calculated by using a past average noise level L' as an initial value and setting a weight w.

$$Lm'=(wL't_1+Lt)/(t+t_1) \qquad (3)$$

The method of detecting a speech mode from a short-term noise level and the method of detecting a speech mode from an average noise level over a long period have been described above. A method as a combination of these two methods is also included in the invention. Specifically, if speech modes selected based on a short-term noise level and a long-term average noise level are different from each other, standard patterns of a plurality of speech modes are used for the recognition of input speech as described in the third embodiment. Information of input speech can be recognized correctly by automatically detecting a speech mode of speech being input by using any of the above methods and making switching to the standard pattern corresponding to the detected speech mode.

The above threshold values and time intervals are ones determined for the experimental conditions of this embodiment; the threshold values and time intervals need to be adjusted in accordance with the speaker and the noise level of the environment where the apparatus is used. The speech modes need not always be the four speech modes used above and may be changed in accordance with the mode of use.

It is proposed to switch the input destination of input information and the function to be performed in connection with input information in accordance with the speech mode, in addition to switching the standard pattern in accordance with the speech mode. A specific example is such that information of the articulator shape is used for speech input in the case of voiceless speech and a function of giving instructions to correct or edit input speech information is effected in the case of small voice speech. If an ordinary speech mode is detected, a function of stopping the speech input mode with a judgment that a conversation with another person has started. Further, it is possible to automatically switching the application program (e.g., spreadsheet software and document processing software) to be used in accordance with the speech mode. In this case, a related speech recognition technique may be employed. Making it possible to switch among such functions in accordance with the speech mode for each user, the invention can make the speech input function much more versatile than in the related techniques.

Embodiment 5

This embodiment is directed to detection of a speech mode difference based on articulator shape information that is obtained by a measuring method other than the specular reflection light spot method, and will show that the invention is effective without being limited by the measuring method.

Figure 10:
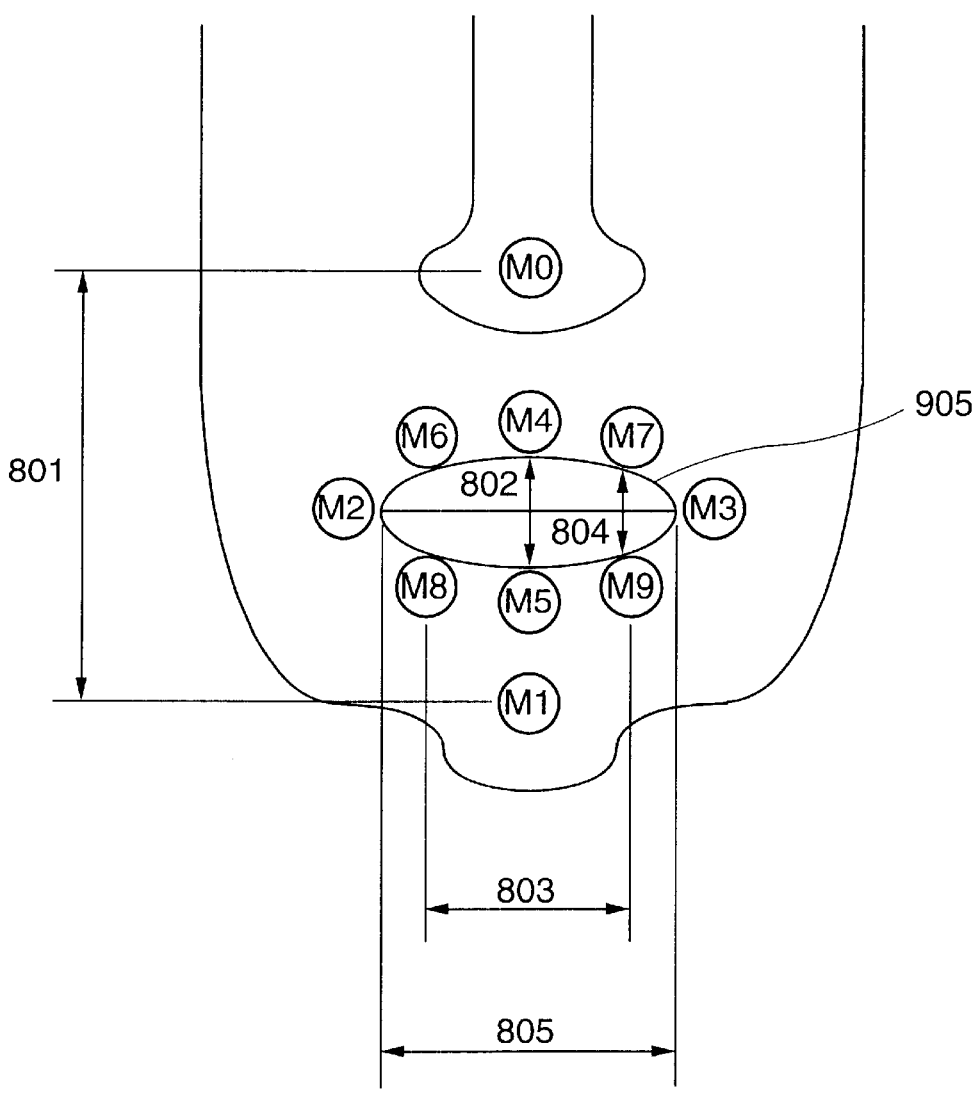
FIG. 10 shows marker attachment positions in a related technique.
Figure 12A:
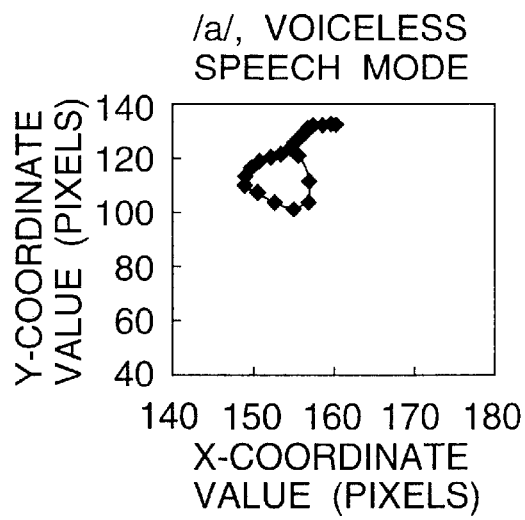
FIGS. 12A to 12D show input data loci of /a/ of the four speech modes, respectively.
Figure 12B:
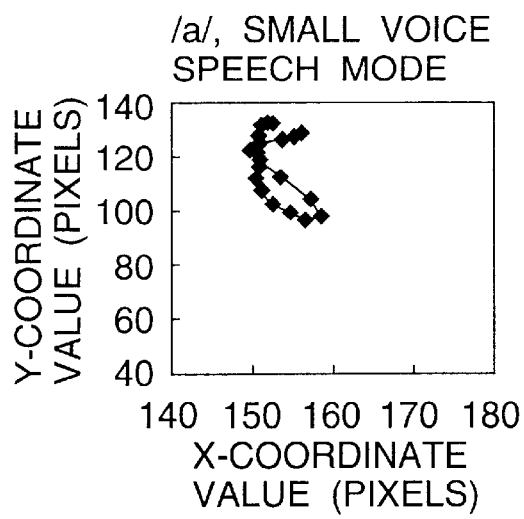
Figure 12C:
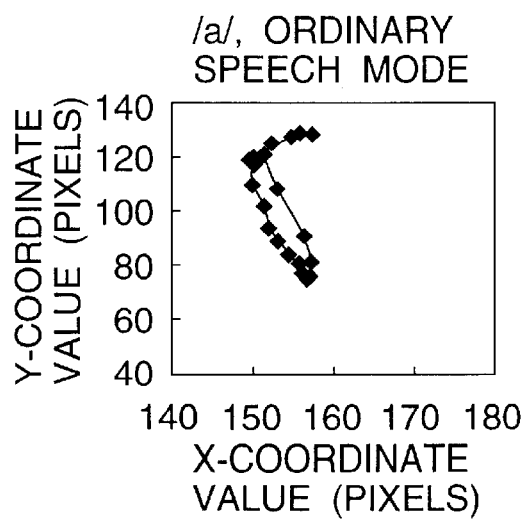
Figure 12D:
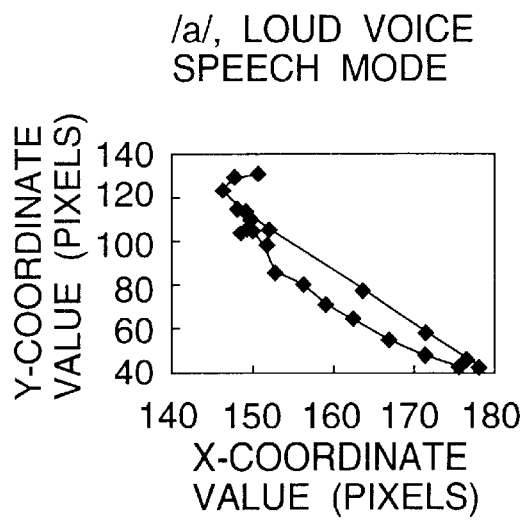
Figure 14A:
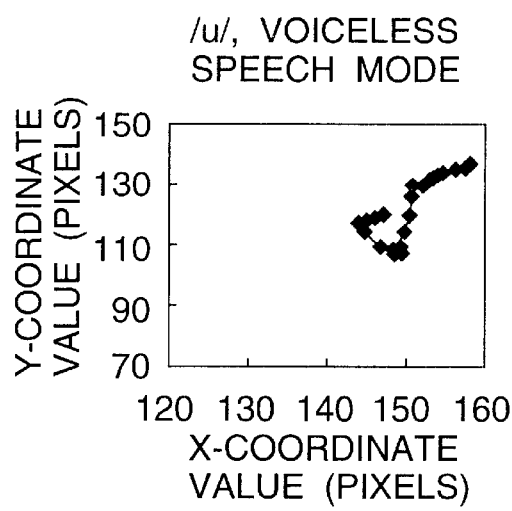
FIGS. 14A to 14D show input data loci of /u/ of the four speech modes, respectively.
Figure 14B:
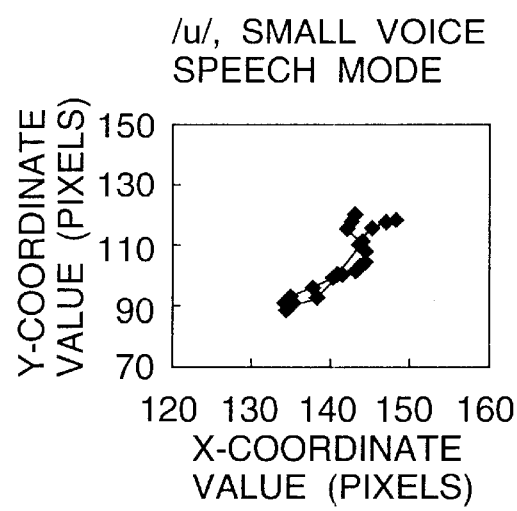
Figure 14C:
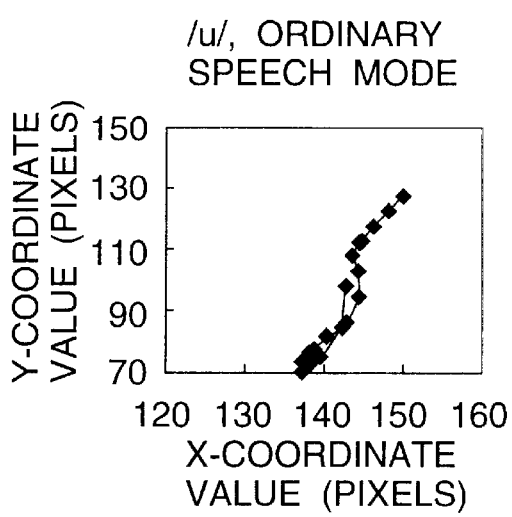
Figure 14D:
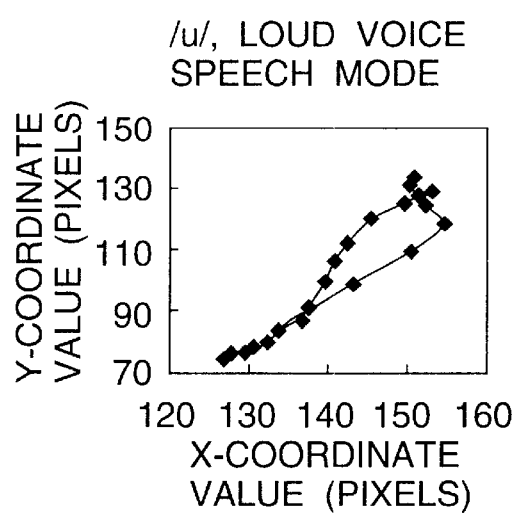

In this embodiment, an articulator shape information measuring method disclosed in Japanese Unexamined Patent Publication No. Sho. 52-112205 was used. In this method, as shown in FIG. 10, speech is detected based on movements of an articulator that are obtained by detecting the positions of markers that are attached to a skin around the lips. In our experiment, among the marker points shown in FIG. 10, two points M4 and M5 located on the center line of the lips were employed to facilitate the marker detection by virtue of remarkable articulator movements there. In the experiment, a member called a retroreflection plate which is used as a traffic sign etc. and returns an incident light beam so that it will travel along the same path as the incident path. This member is configured in such a manner that minute prism shapes or minute hollow spherical surfaces corresponding to corner cubes are formed on the inside surface of a sheet of acrylic or PVC (polyvinyl carbazole). The retroreflection plate markers M4 and M5 have a feature that they can easily be separated from the background in an image because when a light beam is applied to the markers M4 and M5 they reflect it as if they were shining.

Figure 33:
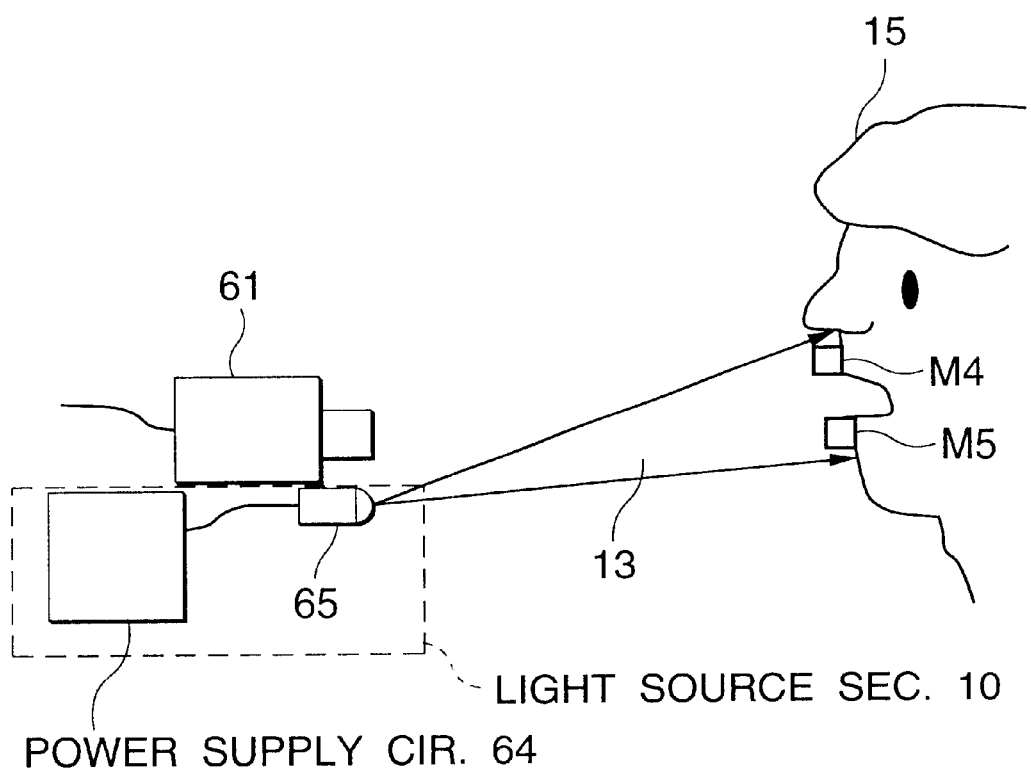
FIG. 33 shows an apparatus used for an experiment of a fifth embodiment of the invention.

In this embodiment, an apparatus shown in FIG. 33 was used as the articulator shape input section 101. This apparatus employs the position detection method itself that uses the two-dimensional CCD camera 61 that was described in the first embodiment. This apparatus calculates the coordinates of a light spot at high speed according to the method of FIG. 7 when only the light spot exists in the screen of the two-dimensional CCD camera 61. Therefore, this apparatus could not execute a complex process of extracting markers from the background of image information and detecting their coordinates, which process is required by the related techniques using markers. To enable such a process, positional information of the markers M4 and M5 was detected by improving the imaging conditions and conducting an experiment in a darkroom so that sufficiently high contract can be obtained between reflection beams coming from the retroreflection plates being illuminated with a light beam 13 and the background screen of the two-dimensional CCD camera 61. However, even when an image of the lips was taken in the darkroom, there frequently occurred an event that reflection light beams coming from white teeth acted as noise light beams that were stronger than reflection light beams from the markers M4 and M5 and the positions of the markers M4 and M5 could not be detected correctly. To prevent this phenomenon, that is, to prevent reflection light beams from coming from teeth, the face of the subject 15 was imaged from the side, rather than from the front, by the two-dimensional CCD camera 61.

With the above apparatus configuration and imaging environment, the markers M4 and M5 in the lip portion of one male subject in his 30s were imaged and the coordinates of their positions were detected. The contents of speech used for input were the following 19 kinds of Japanese phonemes and or syllables.

/a/, /i/, /u/, /e/, /o/, /ka/, /sa/, /ta/, /na/, /ha/, /ma/, /ya/, /ra/, /wa/, /ga/, /za/, /da/, /ba/, /pa/

Each of these phonemes (or syllables) was vocalized randomly two times in each of the voiceless speech mode and the ordinary speech mode. Data of the first-time speech was used as a standard pattern and data of the second-time speech was used as input data.

Figure 34:
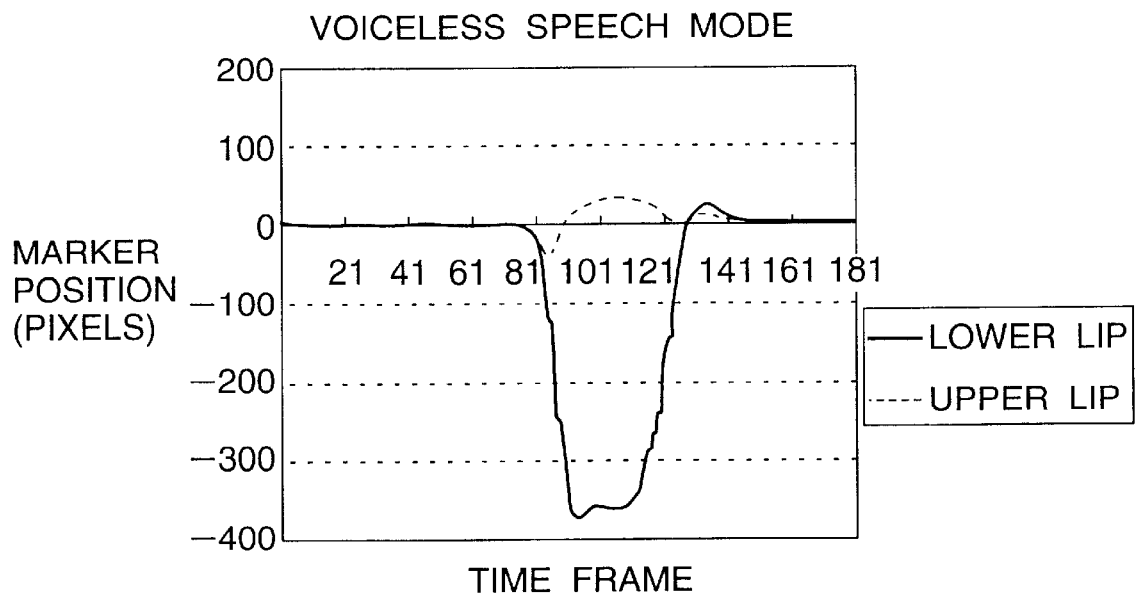
FIG. 34 shows a waveform of data of /a/ that was detected in the voiceless speech mode from markers M4 and M5 that were attached adjacent to the upper and lower lips on their center line.
Figure 35:
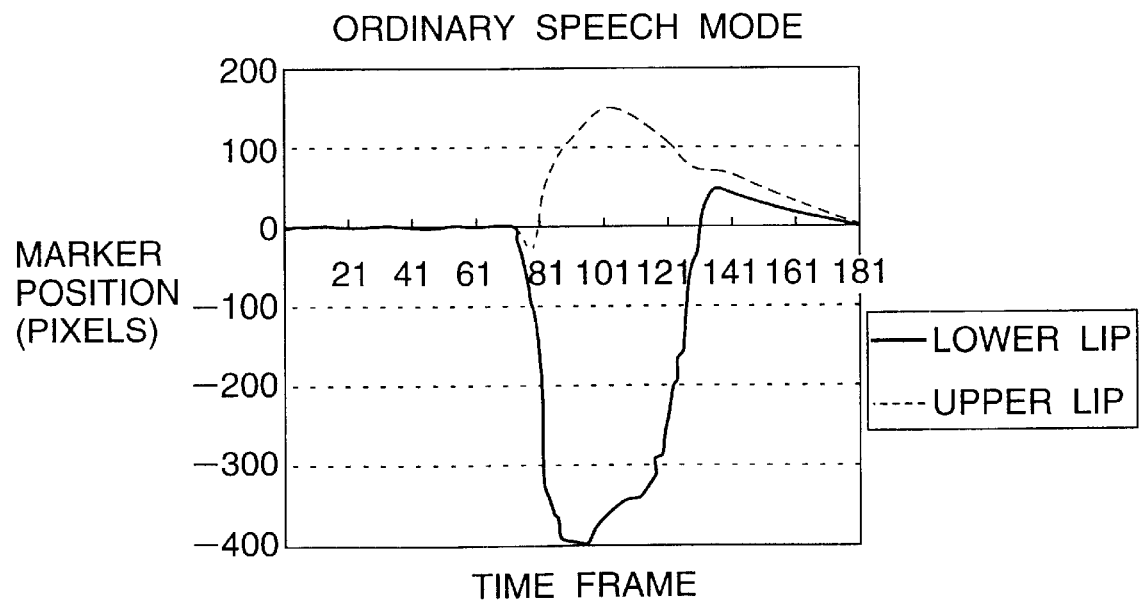
FIG. 35 shows a waveform of data of /a/ that was detected in the ordinary speech mode from the markers M4 and M5 that were attached adjacent to the upper and lower lips on their center line.

Among data obtained, example data of /a/ of the voiceless speech mode is shown in FIG. 34 and example data of /a/ of the ordinary speech mode is shown in FIG. 35. It is seen from FIGS. 34 and 35 that differences between the two speech modes mainly appear in movements of the upper lip. Recognition processing on those data was performed according to a Dynamic programming method that is commonly used for pattern matching of speech etc. instead of using the neural network classification apparatus used in Japanese Unexamined Patent Publication No. Sho. 52-112205. Although the two methods are somewhat different in recognition accuracy, they belong to the same technical field in that the degree of coincidence between a standard pattern and an input data pattern is evaluated.

The distance between each of standard patterns of the voiceless speech mode and the ordinary speech mode and each of input data of the voiceless speech mode and the ordinary speech mode was calculated by using the Dynamic programming method. A phoneme (or syllable) having the shortest distance from input data was employed as a recognition result of the input data. To make detection results easy to understand, they were graphically shown in FIGS. 36 to 39. In each figure, the horizontal axis corresponds to the standard pattern and the vertical axis corresponds to the input data. The kinds of vocalized phonemes (or syllables) are shown in each of the horizontal and vertical axes. Each circle shown in these figures has, as the diameter, the reciprocal of the distance between the corresponding phoneme (or syllable) of the standard pattern (horizontal axis) and the corresponding phoneme (or syllable) of the input data (vertical axis) that was calculated according to the dynamic programming method. Therefore, a pair of patterns on the horizontal and vertical axes is higher in the degree of coincidence as the corresponding circle is larger. Black (solid) circles represent recognition results of the respective input data. In each figure, elements on the main diagonal line are correct recognition results. Therefore, the average recognition rate is higher as more black circles exist on the main diagonal line. The average recognition rate is shown in the bottom part of each figure.

FIG. 36 shows the case where both of the input data and the standard pattern are of the voiceless speech mode. It is seen that many black circles exist on the main diagonal line and hence the average recognition rate is high. FIG. 37 shows the case where the input data is of the voiceless speech mode and the standard pattern is of the ordinary speech mode. It is seen that recognition results are distributed to a large extent in the areas other than the main diagonal line and hence the average recognition rate is low. FIG. 38 shows the case where the input data is of the ordinary speech mode and the standard pattern is of the voiceless speech mode. FIG. 39 shows the case where both of the input data and the standard pattern are of the ordinary speech mode. It is seen that although many black circles exist on the main diagonal line, the area of each element is smaller than in FIG. 36 (both of the input data and the standard pattern are of the voiceless speech mode).

FIG. 40 is a table that summarizes the average recognition rates for the respective combinations of the input data of the two speech modes and the standard patterns of the two speech modes. It is seen from FIG. 40 that the speech recognition rate increases when the speech modes of the input data and the standard pattern are made the same and that the voiceless speech mode provides a higher recognition rate than the ordinary speech mode. These conclusions are equivalent to those of the second embodiment in which the measuring point was set in the lower jaw portion and the specular reflection light spot method was used. This embodiment has proved that the invention is effective for different subjects, different measurement points, and different measuring methods, and that it is important to use the voiceless speech mode to increase the recognition rate in a speech detection apparatus using shape information of an articulator.

As described above, in the technology of detecting speech from, for example, shape information of an articulator, the invention makes it possible to increase the speech detection accuracy by restricting the speech modes of input data and a standard pattern. In particular, the invention makes it possible to greatly improve the speech detection accuracy by using the voiceless speech mode as well as to detect speech contents without requiring a speaker to emit a sound. This solves the principle-related disadvantage of the related speech recognition techniques that speech input cannot be made unless the speaker emits a sound. Not requiring emission of a sound, the invention greatly increases the application range of speech detection apparatus. Further, by switching the speech mode, the invention makes it possible to switch the function to be performed in connection with speech-input information and to increase the recognition rate of input speech in which a plurality of speech modes exist in mixed form. This allows speech input apparatus to have far more versatile functions than in the related techniques.

What is claimed is:

1. A speech detection apparatus comprising:

an articulator shape input section for generating input data by measuring a movement of an articulator that occurs when a speaker makes speech from at least part of the articulator and an integument around the articulator;

a speech mode input section for allowing input of a speech mode of the speaker; and a speech detection section for detecting the speech by comparing the input data generated by the articulator shape input section based on the speech of the speaker with one kind of standard pattern that is prepared in advance, wherein a speech recognition process is only executed when the speech mode that is input through the speech mode input section is the one kind of standard pattern.

2. The speech detection apparatus according to claim 1, wherein the speech mode of the one kind of standard pattern is a voiceless speech mode.

3. The speech detection apparatus according to claim 1, wherein the speech mode input section detects volume of the speech of the speaker with a microphone, and determines a speech mode based on a measured noise level.

4. The speech detection apparatus according to claim 3, wherein the speech mode input section measures the noise level in a short period.

5. The speech detection apparatus according to claim 3, wherein the speech mode input section measures the noise level in a long period.

6. The speech detection apparatus according to claim 3, wherein an noise level index measured by the speech mode input section is determined by a combination of a noise level measure in a short period and a noise level measured in a long period, and wherein the speech mode input section determines a speech mode based on the noise level index.

7. The speech detection apparatus according to claim 1, wherein the articulator shape input section employs a specular reflection light spot method.

8. The speech detection apparatus according to claim 1, wherein the articulator shape input section employs an optical flow method.

9. The speech detection apparatus according to claim 1, wherein the articulator shape input section employs a marker method.

10. The speech detection apparatus according to claim 9, wherein a movement of a marker that is attached to the speaker is detected from a side.

11. A speech detection apparatus comprising:

an articulator shape input section for generating input data by measuring a movement of an articulator that occurs when a speaker makes speech from at least part of the articulator and an integument around the articulator;

a speech mode input section for allowing input of a speech mode of the speaker;

a speech detection section for detecting the speech by comparing the input data generated by the articulator shape input section based on the speech of the speaker with one of plural kinds of standard patterns that are prepared in advance; and a standard pattern selection section for selecting one kind of standard pattern of a speech mode that coincides with the speech mode that is input through the speech mode input section, a speech detection process being executed upon selection of the one kind of standard pattern, wherein a function to be performed in connection with input speech data is switched in accordance with the speech mode that is input through the speech mode input section.

12. The speech detection apparatus according to claim 11, wherein the plural kinds of standard patterns include standard patterns of a voiceless speech mode, a voiced speech mode, and unvoiced speech mode.

13. The speech detection apparatus according to claim 11, wherein the plural kinds of standard patterns include standard patterns of a voiceless speech mode and a voiced speech mode.

14. The speech detection apparatus according to claim 11, wherein switching is made, in accordance with the speech mode, among a function of allowing input of coded text information, a function of giving an instruction relating to a particular operation, and a function of stopping input.

15. The speech detection apparatus according to claim 11, wherein switching is made automatically, in accordance with the speech mode, among plural kinds of application software.

16. A speech detection apparatus comprising:

an articulator shape input section for generating input data by measuring a movement of an articulator that occurs when a speaker makes speech from at least part of the articulator and an integument around the articulator;

a speech mode input section for allowing input of a speech mode of the speaker;

a speech detection section for detecting the speech by comparing the input data generated by the articulator shape input section based on the speech of the speaker with two or more of plural kinds of standard patterns that are prepared in advance; and a standard pattern selection for selecting two or more kinds of standard patterns corresponding to speech modes that include a speech mode that coincides with the input speech mode that is input through the speech mode, a speech detection process being executed upon selection of the two or more kinds of standard patterns, wherein a function to be performed in connection with input speech data is switched in accordance with the speech mode that is input through the speech mode input section.

17. The speech detection apparatus according to claim 16, wherein the speech mode input section detects a first noise level in a short period and a second noise level in a long period, and wherein if speech modes determined based on the first and second noise levels are different from each other, the standard pattern selection section selects two kinds of standard patterns corresponding to the respective determined speech modes.

18. The speech detection apparatus according to claim 16, further comprising a standard patterns storage section for storing standard patterns of a plurality of voiced speech modes that are featured in loudness, pitch, or length of voice.

19. A speech detection apparatus comprising:

an articulator shape input section for generating input data by measuring a movement of an articulator that occurs when a speaker makes speech from at least part of the articulator and an integument around the articulator;

a speech mode input section for allowing input of a speech mode of the speaker; and a speech detection section for detecting the speech by comparing the input data generated by the articulator shape input section based on the speech of the speaker with a standard pattern for voiceless speech that is prepared in advance, wherein a function to be performed in connection with input speech data is switched in accordance with the speech mode that is input through the speech mode input section.

20. A speech detection apparatus comprising:

an input section for generating, based on speech of a speaker, input data representing a feature of the speech;

a speech mode input section for allowing input of a speech mode of the speaker; and a speech detection section for detecting the speech by comparing the input data generated by the input section based on the speech of the speaker with one kind of standard pattern that is prepared in advance, wherein a speech recognition process is only executed when the speech mode that is input through the speech mode input section is the one kind of standard pattern.

21. A speech detection apparatus comprising:

an input section for generating, based on speech of a speaker, input data representing a feature of the speech;

a speech mode input section for allowing input of a speech mode of the speaker; and a speech detection section for detecting the speech by comparing the input data generated by the input section based on the speech of the speaker with a standard pattern that is prepared in advance, wherein a function to be performed in connection with input speech data is switched in accordance with the speech mode that is input through the speech mode input section.

* * * * *